(12) United States Patent
Huang et al.

(10) Patent No.: US 10,891,969 B2
(45) Date of Patent: Jan. 12, 2021

(54) TRANSFORMING AUDIO CONTENT INTO IMAGES

(71) Applicant: Microsoft Technology Licensing, LLC, Redmond, WA (US)

(72) Inventors: Li Huang, Sammamish, WA (US); Houdong Hu, Redmond, WA (US); Congyong Su, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 16/165,281

(22) Filed: Oct. 19, 2018

(65) Prior Publication Data

US 2020/0126584 A1    Apr. 23, 2020

(51) Int. Cl.
| | | |
|---|---|---|
| G10L 21/12 | (2013.01) | |
| G10L 15/16 | (2006.01) | |
| G10L 15/18 | (2013.01) | |
| G10L 21/18 | (2013.01) | |
| G10L 15/14 | (2006.01) | |
| G10L 15/02 | (2006.01) | |

(Continued)

(52) U.S. Cl.
CPC ............. G10L 21/12 (2013.01); G10L 15/02 (2013.01); G10L 15/144 (2013.01); G10L 15/16 (2013.01); G10L 15/1815 (2013.01); G10L 21/10 (2013.01); G10L 21/18 (2013.01); G10L 25/63 (2013.01); *G10L 15/063* (2013.01); *G10L 15/26* (2013.01); *G10L 2015/225* (2013.01)

(58) Field of Classification Search
CPC ..... G10L 15/02; G10L 15/142; G10L 15/144; G10L 15/16; G10L 2015/225; G10L 15/26; G10L 15/265; G10L 21/10; G10L 21/12; G10L 21/18; G10L 25/63; G10L 15/063; G10L 15/1815

See application file for complete search history.

(56) References Cited

U.S. PATENT DOCUMENTS 9,363,378 B1 * 6/2016 McDaniel ............. H04M 3/533
9,596,349 B1    3/2017 Hernandez
(Continued)

FOREIGN PATENT DOCUMENTS

EP       1796347 A1    6/2007

OTHER PUBLICATIONS

U.S. Appl. No. 62/578,345, filed Oct. 27, 2017.*
(Continued)

*Primary Examiner* — Eric Yen

(57) ABSTRACT

A technique is described herein for transforming audio content into images. The technique may include: receiving the audio content from a source; converting the audio content into a temporal stream of audio features; and converting the stream of audio features into one or more images using one or more machine-trained models. The technique generates the image(s) based on recognition of: semantic information that conveys one or more semantic topics associated with the audio content; and sentiment information that conveys one or more sentiments associated with the audio content. The technique then generates an output presentation that includes the image(s), which it provides to one or more display devices for display thereat. The output presentation serves as a summary of salient semantic and sentiment-related characteristics of the audio content.

20 Claims, 16 Drawing Sheets

(51) Int. Cl.
*G10L 25/63* (2013.01)
*G10L 21/10* (2013.01)
*G10L 15/06* (2013.01)
*G10L 15/26* (2006.01)
*G10L 15/22* (2006.01)

(56) References Cited

U.S. PATENT DOCUMENTS

| | | | | |
|---|---|---|---|---|
| 9,848,082 | B1* | 12/2017 | Lillard | H04M 3/5231 |
| 10,074,200 | B1* | 9/2018 | Yeturu | G06T 11/00 |
| 10,430,946 | B1* | 10/2019 | Zhou | G16H 50/20 |
| 10,504,268 | B1* | 12/2019 | Huang | G06F 3/011 |
| 10,616,666 | B1* | 4/2020 | Pontiff | H04N 21/2668 |
| 10,620,631 | B1* | 4/2020 | Abeloe | G06N 3/082 |
| 10,699,718 | B2* | 6/2020 | Kim | G06F 1/3215 |
| 2005/0143108 | A1* | 6/2005 | Seo | H04M 1/72552 455/466 |
| 2007/0033050 | A1* | 2/2007 | Asano | G06F 16/436 704/270 |
| 2008/0040110 | A1* | 2/2008 | Pereg | G10L 17/26 704/236 |
| 2008/0163074 | A1* | 7/2008 | Tu | G10L 13/08 715/758 |
| 2009/0265170 | A1* | 10/2009 | Irie | G10L 17/26 704/236 |
| 2010/0257129 | A1* | 10/2010 | Lyon | G10L 25/48 706/12 |
| 2011/0013756 | A1* | 1/2011 | Davies | G10L 15/22 379/88.14 |
| 2011/0208523 | A1 | 8/2011 | Kuo | |
| 2012/0058747 | A1* | 3/2012 | Yiannios | H04M 1/72544 455/414.1 |
| 2012/0116761 | A1* | 5/2012 | Wang | G10L 21/10 704/235 |
| 2013/0173269 | A1 | 7/2013 | Adler et al. | |
| 2014/0164507 | A1* | 6/2014 | Tesch | H04L 51/10 709/204 |
| 2014/0192229 | A1* | 7/2014 | Kim | H04N 5/2258 348/231.3 |
| 2015/0206543 | A1* | 7/2015 | Lee | G10L 25/63 704/270 |
| 2015/0350438 | A1* | 12/2015 | Arslan | G10L 25/63 379/88.01 |
| 2017/0263265 | A1* | 9/2017 | Ashikawa | G06F 3/04817 |
| 2017/0270701 | A1* | 9/2017 | Okaniwa | G06F 40/35 |
| 2017/0365038 | A1* | 12/2017 | Denton | G06T 5/00 |
| 2018/0077095 | A1 | 3/2018 | Deyle et al. | |
| 2018/0101770 | A1* | 4/2018 | Tanaka | G06N 3/0454 |
| 2018/0121800 | A1* | 5/2018 | Kanda | G06N 3/0445 |
| 2018/0295081 | A1* | 10/2018 | McGregor, Jr. | H04L 51/02 |
| 2019/0042574 | A1* | 2/2019 | Kim | G06F 3/04845 |
| 2019/0051310 | A1* | 2/2019 | Chang | G10L 19/005 |
| 2019/0095959 | A1* | 3/2019 | Yu | G06Q 30/0276 |
| 2019/0122664 | A1* | 4/2019 | Oikawa | G10L 15/22 |
| 2019/0130266 | A1* | 5/2019 | Cao | G06N 3/0472 |
| 2019/0190865 | A1* | 6/2019 | Jeon | G06K 9/00228 |
| 2019/0279036 | A1* | 9/2019 | Pan | G06N 3/049 |
| 2019/0354808 | A1* | 11/2019 | Park | G10L 15/16 |
| 2019/0355347 | A1* | 11/2019 | Arik | G06N 20/20 |
| 2020/0005784 | A1* | 1/2020 | Vadackupurath Mani | G06K 9/00335 |
| 2020/0019642 | A1* | 1/2020 | Dua | G06F 16/3347 |

OTHER PUBLICATIONS

Konstantinos Vougioukas, Stavros Petridis, Maja Pantic, "End-to-End Speech-Driven Facial Animation with Temporal GANs", last revised Jul. 19, 2018, British Machine Vision Conference (Year: 2018).*

Francisco Roldan Snchez, "Speech-conditioned Face Generation with Deep Adversarial Networks", Jul. 2018, Master Thesis Dissertation, Master in Computer Vision (Year: 2018).*

Daunt, Joe, "This virtual character can translate speech into sign language," available at <<https://www.businessinsider.com/hand-talk-app-translate-speech-sign-language-hugo-brazil-libras-2016-9?IR=T>>, Business Insider, launch page to online video, Sep. 11, 2016, 2 pages.

Panchal, Amitkumar O., "Speech Recognition Using Recurrent Neural Network," in International Journal of Innovative Research in Technology (IJIRT), vol. 2, No. 5, Oct. 2015, 4 pages.

Maghilnan, et al., "Sentiment Analysis on Speaker Specific Speech Data," available at <<https://arxiv.org/ftp/arxiv/papers/1802/1802.06209.pdf>>, in 2017 International Conference on Intelligent Computing and Control (I2C2), Jun. 2017, 5 pages.

Xu, et al., "AttnGAN: Fine-Grained Text to Image Generation with Attentional Generative Adversarial Networks," in arXiv:1711.10485v1 [cs.CV], Nov. 28, Nov. 2017, 9 pages.

Gatys, et al., "Image Style Transfer Using Convolutional Neural Networks," available at <<https://www.cv-foundation.org/openaccess/content_cvpr_2016/papers/Gatys_Image_Style_Transfer_CVPR_2016_paper.pdf>>, in 2016 IEEE Conference on Computer Vision and Pattern Recognition (CVPR), 2016, 10 pages.

Sathyan, et al., "Aiding System for Deaf and Dumb Persons Based on Speech and Image Processing Algorithm," in International Journal of Advance Engineering and Research Development (IJAERD), vol. 1, No. 5, May 2014, 7 pages.

Shen, et al., "Style Transfer from Non-Parallel Text by Cross-Alignment," in arXiv:1705.09655v2 [cs.CL], Nov. 6, 2017, 12 pages.

Tejedor, et al., "Augmented Service for Deaf People Using a Text to Sign Language Translator," in Proceedings of Interaccion, 2006, 4 pages.

Ji, Hen, "Sentiment, Opinions, Emotions," available at <<https://pdfs.semanticscholar.org/presentation/045d/6f36c8036c19fa8e21eeea1b146de2520a60.pdf>>, slide presentation, Rensselaer Polytechnic Institute, Troy, New York, 2014, 156 pages.

"Text-to-Picture Synthesis Project," available <<http://pages.cs.wisc.edu/~jerryzhu/ttp/>>, University of Wisconsin, Madison, Wisconsin, accessed on Sep. 24, 2018, 6 pages.

Sharma, "ChatPainter: Improving Text to Image Generation using Dialogue," in arXiv:1802.08216v1 [cs.CV], Feb. 22, 2018, 9 pages.

Zhang, et al., "StackGAN: Text to Photo-realistic Image Synthesis with Stacked Generative Adversarial Networks," in arXiv:1612.03242v2 [cs.CV], Aug. 5, 2017, 14 pages.

Dumoulin, et al., "A Learned Representation for Artistic Style," in arXiv:1610.07629v5 [cs.CV], Feb. 9, 2017, 11 pages.

Graves, et al., "Speech Recognition with Deep Recurrent Neural Networks," in arXiv:1303.5778v1 [cs.NE], Mar. 22, 2013, 5 pages.

PCT Search and Written Opinion for PCT/US2019/049612 dated Mar. 24, 2020, 20 pages.

Wan, et al., "Towards Audio to Scene Image Synthesis using Generative Adversarial Network," arXiv reprint, arXiv:1808.04108v1 [cs.CL], Aug. 13, 2018, 7 pages.

* cited by examiner

US 10,891,969 B2

TRANSFORMING AUDIO CONTENT INTO IMAGES

BACKGROUND

Present-day technology permits users to create and store a large number of audio items, such as audio messages, songs, interviews, audio books, etc. However, current technology does not provide equally effective tools for managing and accessing the audio items once they are created. For instance, a user may have difficulty finding an audio file that contains a desired audio segment within a large collection of audio files. This may force the user to perform the painstaking and time-intensive task of listening to multiple audio files to determine if they contain the desired audio segment. A user may give the audio file a descriptive name, but this strategy typically provides only limited assistance to the user in later finding desired audio content.

In other situations, a user may have difficulty in interpreting audio content being played back or being captured in real time. The user's difficulty may stem from some disability that affects the user (such as a hearing-related impairment), the listener's confusion, and/or distractions posed by the listening environment.

SUMMARY

A technique is described herein for transforming audio content into images. The technique may include: receiving the audio content from a source; converting the audio content into a temporal stream of audio features; and converting the stream of audio features into one or more images using one or more machine-trained models. The technique generates the image(s) based on recognition of: semantic information that conveys one or more semantic topics associated with the audio content; and sentiment information that conveys one or more sentiments (e.g., emotions, opinions, etc.) associated with the audio content. The technique then generates a graphical output presentation that includes the image(s), which it provides to one or more display devices for display thereat. The output presentation serves as a summary of salient semantic and sentiment-related characteristics of the audio content.

According to one illustrative aspect, the technique employs an ATI audio-to-image (ATI) engine which includes: a speech recognizer engine for converting the stream of audio features into text information; a sentiment classification engine for identifying sentiment information associated with the audio content; and an image creation engine for generating the image(s) based on the text information and the sentiment information.

According to another illustrative aspect, the ATI engine can further include a style transfer engine for modifying the image(s) into style-enhanced image(s) that reflect the sentiment information.

According to another illustrative aspect, various applications can make use of the ATI engine. One application uses the ATI engine to summarize a received message which contains audio content. Another application uses the ATI engine to create visually-descriptive file icons for audio files. Another application uses the ATI engine to visually enhance real-time or recorded speech for the benefit of an impaired listener, and so on.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 also shows an overview of a training system that is used to train the image creation engine.

Figure 1:
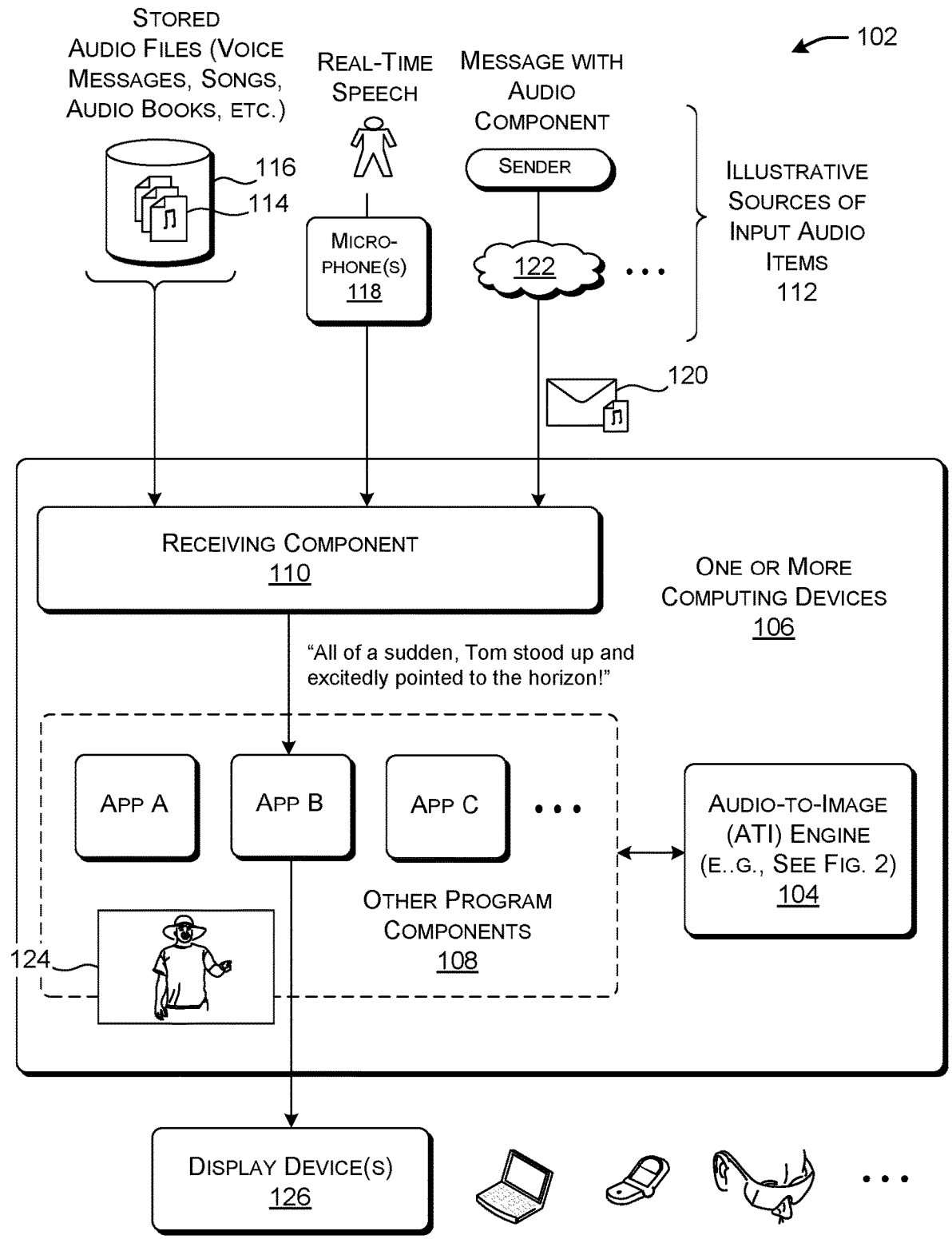
FIG. 1 shows an illustrative computing environment for converting audio content into one or more images.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for converting audio content into one or more images. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry. The term "component" or "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuity of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. ILLUSTRATIVE COMPUTING ENVIRONMENT

A.1. Overview

FIG. 1 shows an illustrative computing environment 102 for converting audio content into one or more images. The image(s) convey both the semantic and sentiment-related characteristics of the audio content. That is, the image(s) visually depict one or more topics and one or more sentiments associated with the audio content. As the term is used herein, "sentiment" broadly encompasses the type(s) of emotion exhibited by a user (joy, excitement, anger, worry, etc.), the polarity of those emotions (e.g., negative, positive, neural), the content of opinions expressed by the user, the polarity of those opinions, etc.

Generally, a user can quickly gain an understanding of the salient features of audio content by viewing the image(s) associated therewith. In some user scenarios, this allows the user to take action on the audio content without necessarily listening to it. In other user scenarios, the images assist the user in interpreting the audio content as it is being played back in synchronization with the presentation of the images. Subsection A.2 provides further details regarding four illustrative applications of the computing environment 102 described herein.

An audio-to-image (ATI) engine 104 performs the above-summarized conversion of audio content to image information. One or more computing devices 106 implement the ATI engine 104. For instance, the ATI engine 104 may correspond to an application program or operating system (OS) program provided by the computing device(s) 106. One or more other program components 108 (e.g., app A, app B, app C, etc.) utilize the ATI engine 104 to perform different context-specific functions, examples of which are described in Subsection A.2 (below). In one implementation, any program component can interact with the ATI engine 104 through an application programming interface (API) or some other interface protocol. In another implementation, a program component may incorporate the logic associated with the ATI engine 104 within its code.

The computing device(s) 106 may correspond to one or more devices of any kind(s) that perform computing functions. For instance, the computing device(s) 106 can include a workstation-type personal computing device, a laptop computing device, a handheld computing device of any type (such as a smartphone), a game console, a mixed-reality device of any type, a wearable computing device, a smart appliance, a vehicle-borne computing device, and so on. In some implementations, the computing device(s) 106 implements all aspects of the ATI engine 104 using device hardware that is local with respect to a location of a user who interacts with the computing device(s) 106. In other implementations, the computing device(s) 106 distributes at least some aspects of the ATI engine 104 to processing resources that are remote with respect to the location of the user. In that case, the computing device(s) 106 includes at least one local computing device which interacts with one or more remote computing devices (e.g., one or more servers) via a computer network.

A receiving component 110 receives the audio content from various sources 112. The receiving component 110 can include an input interface mechanism governed by any protocol(s), such as a network interface controller, a microphone driver, etc. In one case, the receiving component 110 receives an audio file 114 from a local or remote data store 116. The audio file 114 can represent the audio content in any format, including formats without compression (as the WAV files), formats with lossless compression (such as an MPEG format), and formats with lossy compression (such as the MP3 format). As to meaning, the audio content can correspond to recorded speech, songs, natural sounds in the environment, etc. In other cases, a file can include multiple types of media content, including audio. For instance, a file can provide a movie having both visual content and audio content.

In another user scenario, the receiving component 110 receives a stream of audio content from one or more microphones 118. The microphone(s) 118, for instance, can capture the real-time speech of a user, or the real-time performance of a song, etc.

In another user scenario, the receiving component 110 can receive a message 120 from a sender via a computer network 122. The message 120 includes audio content, e.g., as an attached or embedded audio file. For instance, the message 120 can include a voice message created by the sender for consumption by a designated recipient, to whom the message 120 is sent.

The above-described user scenarios are set forth in the spirit of illustration, not limitation. Other implementations can convert audio content into image content in any other contexts.

FIG. 1 shows that an app B receives audio content which contains the sentence, "All of a sudden, Tom stood up and excitedly pointed to the horizon!" For instance, this statement may correspond to a sentence in an audio book received by the receiving component 110 from the data store 116. The app B uses the ATI engine 104 to convert this audio content into at least one image 124. The image 124 depicts a man standing up and pointing, thereby expressing at least the semantic import of the audio content. As explained below, the image 124 may also have content that expresses the emotion of excitement conveyed by the audio content.

The computing device(s) 106 displays an output presentation which includes the image 124 as part thereof. The display device(s) 126 may be integrated with the computing device(s) 106, or may correspond to one or more devices apart from the computing device(s) 106. Each application governs the appearance and interactive features of the output presentation which includes the image 124.

Figure 2:
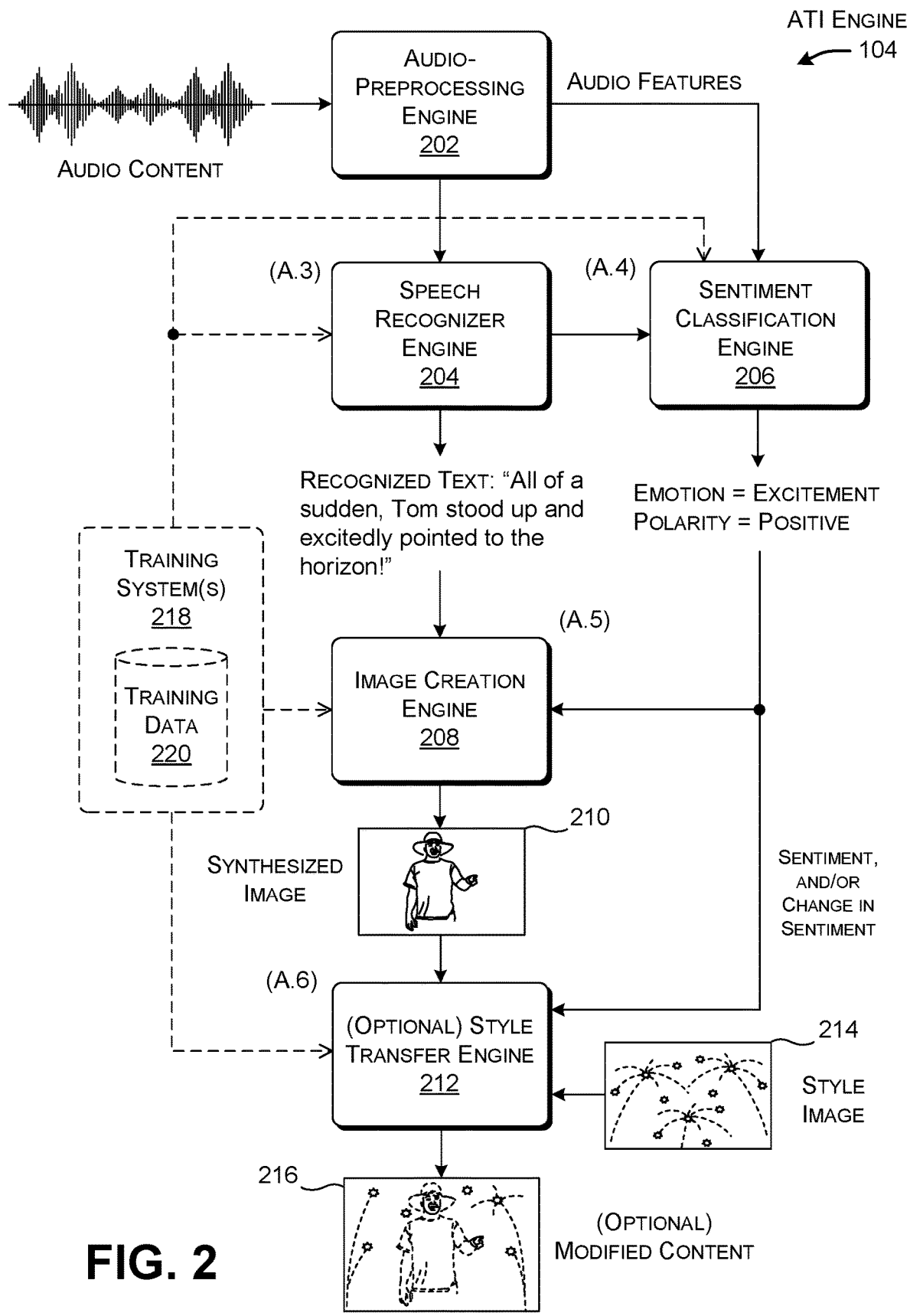
FIG. 2 shows one implementation of an audio-to-image (ATI) engine for use in the computing environment of FIG. 1.

FIG. 2 shows one implementation of the audio-to-image (ATI) engine 104. FIG. 2 is explained in the context of the processing of the above-noted spoken sentence, "All of a sudden, Tom stood up and excitedly pointed to the horizon!"

An audio-preprocessing engine ("preprocessing engine") 202 generates a stream of features that describe the audio content. In one implementation, the preprocessing engine 202 organizes the features into frames corresponding to an environment-specific span of time, such as 50 ms, 100 ms, 200 ms, etc. The features describe the audio waveform associated with each frame. The preprocessing engine 202 can generate any type(s) of features, including "raw" features which describe, at each sampling time, the amplitude of the audio signal, the frequency of the audio waveform, etc. In addition, or alternatively, the preprocessing engine 202 can generate higher-level features, including any of: Mel-Frequency Cepstral Coefficients (MFCCs) features, signal energy-related features (e.g., spectral entropy, spectral spread, etc.), signal zero-crossing rate features, etc. The preprocessing engine 202 can also capture prosodic information associated with the speech, such as its rhythms, pauses, loudness, etc.

In some implementation, the preprocessing engine 202 can optionally discriminate between those features that primarily describe speech and those features which primary describe non-speech, such as background noise. The preprocessing engine 202 can perform this task in various ways, such as by using a noise separation filter, a machine-trained neural network, etc.

A speech recognizer engine 204 converts the stream of audio features received from the preprocessing engine 202 to text information. The speech recognizer engine 204 can perform this task using any machine-trained model. Subsection A.3 (below) describes one non-limiting implementation of the speech recognizer engine 204 that uses a Recurrent Neural Network (RNN). Other implementations can use other conversion techniques to convert audio content to text information, such as a Hidden Markov Model (HMM) technique. Assume that the speech recognizer correctly converts the audio stream into the text sentence, "All of a sudden, Tom stood up and excitedly pointed to the horizon!"

A sentiment classification engine 206 generates sentiment information associated with the audio content based on the original audio features provided by the preprocessing engine 202 and text information output by the speech recognizer engine 204. Sentiment information broadly refers to the psychological states or judgments reflected in the audio content, if any. For instance, the sentiment information can describe one or more emotions expressed by the audio content. In addition, or alternatively, the sentiment information can describe one or more opinions expressed by the audio content. In addition, or alternatively, the sentiment information can characterize the polarity of any psychological state expressed in the audio content, such as by indicating whether an emotion or opinion is positive, negative, or neutral, etc., or by ranking the intensity of a psychological state on a specified scale.

In one implementation, the sentiment classification engine 206 can use a single machine-trained classifier to perform all of its sentiment-based analysis on the audio content. In other implementations, the sentiment classification engine 206 can use different classifiers to extract different kinds of sentiment information from the audio content. More generally, the sentiment classification engine 206 can use any machine-trained classifier(s) to perform these tasks. Subsection A.4 describes an implementation of the sentiment classification engine 206 that uses a Convolutional Neural Network (CNN) model, but other implementations can use a Support Vector Machine (SVC) model, a decision tree model, a linear classifier model, a Bayesian classifier model, and so on. In the representative example of FIG. 2, assume that the sentiment classification engine 206 indicates that one emotion associated with the audio content is "excitement," and the polarity of this emotion is "positive." As explained below, further note that the sentiment(s) associated with even a single sentence can change over the course of a user's spoken delivery of that sentence; the ATI engine 104 can take these variations into account in generating its images, as explained in greater detail in Subsection A.6.

An image creation engine 208 generates at least one image based on text information output by the speech recognizer engine 204 and sentiment information output by the sentiment classification engine 206. Subsection A.5 describes two ways that the image creation engine 208 can perform this task. In a first approach, the image creation engine 208 uses a machine-trained generative model to generate the image(s), e.g., trained using a generative adversarial network (GAN). In this case, the image creation engine 208 synthesizes the image(s) based on the model that has been learned. The image(s) are created from "scratch," meaning that they will generally have no preexisting "real" image counterparts. In a second approach, the image creation engine 208 can use an image search component to find the real preexisting image(s) that most closely match the input text information and sentiment information. In the example of FIG. 2, assume that the image creation engine 208 synthesizes a single image 210 that shows a man standing and pointing. In other cases, the image creation engine 208 can generate two or more images that describe the input audio content, such as a first image that shows a man standing, and a second image that shows a man pointing.

An optional style transfer engine 212 can transform the original image(s) provided by the image creation engine 208 into style-modified image(s) based on the sentiment information (here, "excitement") generated by the sentiment classification engine 206. In one implementation, the style transfer engine 212 performs this task by identifying a style image 214 that has been previously associated with the sentiment of "excitement." Here, the style image 214 includes a highly kinetic scene including exploding fireworks against a night sky. Generally, the style images can correspond to previous photographs, previous computer-generated images, reproductions of artwork (such as a painting by Rembrandt, or Van Gogh, Picasso, etc.), and so on. In one approach, the style transfer engine 212 modifies original image 210 such that it incorporates the low-level texture information conveyed by the style image 214, while preserving the high-level semantic content associated with the original image 210. This yields the modified image 216 that appears to adopt the texture of the style image 214, while still depicting a man standing and pointing. Subsection A.6 describes two implementations of the style transfer engine 212; the first uses a machine-trained neural network to merge the original image 210 with the style image 214, while the second retrieves style-related image content from a data store and overlays it on the original image 210.

In summary, note that the ATI engine 104 extracts both semantic and sentiment information from the audio content. The ATI engine 104 primarily relies on the speech recognizer engine 204 and image creation engine 208 to extract semantic information, e.g., as implicitly expressed in the hidden information produced by its models. The ATI engine 104 primarily relies on the sentiment classification engine 206 to generate the sentiment information, although the sentiment classification engine 206 also extracts semantic information insofar as the task of interpreting the emotions and opinions expressed in audio content contributes to the meaningfulness of the image(s) that are eventually produced.

One or more training systems 218 produce the various machine-trained models used by the ATI engine 104. In another case, the training system(s) 218 produces a single machine trained model that integrates the functions associated with the above-described separate processing engines. In other words, in this case, the training system(s) 218 provides a machine-trained model that provides an end-to-end solution, e.g., by converting input audio content into one or more output images. Generally, the training system(s) 218 rely on one or more sets of training examples provided in one or more stores 220. The training system 218 and the nature of the training data will be described in greater detail below in the context of explanation of the various sub-engines used by the ATI engine 104.

Figure 3:
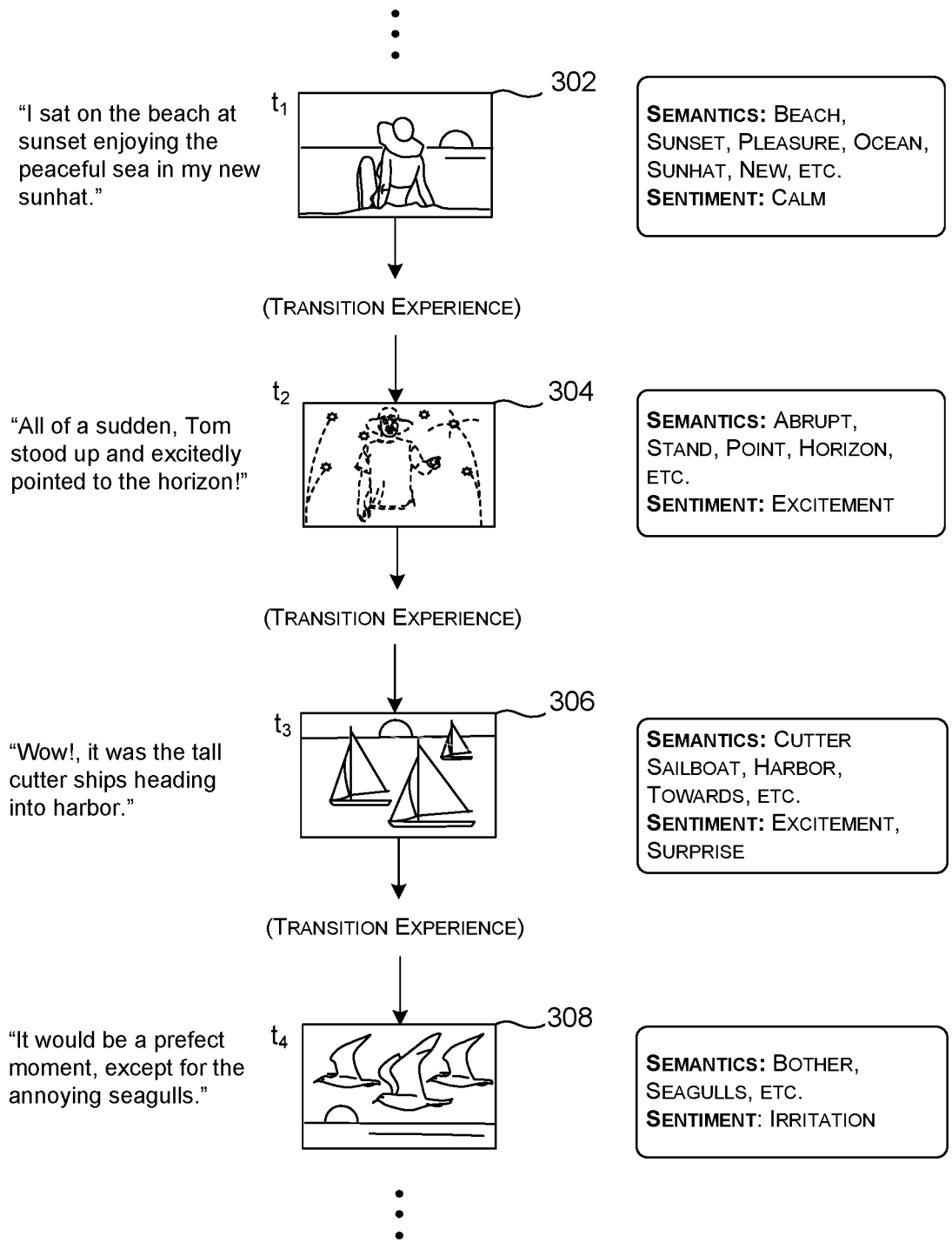
FIG. 3 shows an overview of one manner of operation of the computing environment of FIG. 1.

FIG. 3 shows another example of the operation the ATI engine 104. In this case, the ATI component 104 receives at least four sentences spoken in order. The ATI engine converts each spoken sentence into at least one image. An application can present the output images (302, 304, 306, 308) in sequence to create a slideshow or movie. The application can present the output images (302, 304, 306, 308) in synchronization with the playout of the audio content, or as a replacement to the audio content. FIG. 3 also shows the semantic and sentiment-related topics identified by the ATI engine 104 in the course of processing it.

Further note that, in the examples presented herein, the input audio content contains human speech expressed in some natural language. In addition, or alternatively, the input audio content can include sounds other than human speech, such as sounds made by animals, musical instruments, natural objects, etc. For example, the ATI engine 104 produce one or more images that show an angry dog when the audio clip contains sounds of a barking dog. In another case, the ATI engine 104 can produce one or more images that show a peaceful bucolic setting for certain natural sounds, or for relaxing music. In another case, the ATI engine 104 can display a turbulent sea for more rousing music.

In one implementation, the speech recognizer engine 204 can output null-value information when it encounters audio content that has no meaningful human speech. In this implementation, the ATI engine 104 will rely on the sentiment classifier to associate the audio content with one or more emotions, one or more moods, etc. In another case, the speech recognizer engine 104 can expands its function by "translating" nonlinguistic sounds to concepts, which reflects the manner in which humans typically interpret these sounds. That is, dogs, for instance, do not speak, but the speech recognizer engine 204 can interpret various sounds that they make as akin to speech, such as by translating a whimper to the emotion of sadness. More generally, the training system(s) 218 processes training examples that reflect the ways in which humans associate different non-linguistic sounds into concepts and sentiments; insofar as there are patterns in the way humans interpret these sounds, the ATI engine 104 will capture these patterns in its various machine-learned models.

A.2. Illustrative Applications

Figure 4:
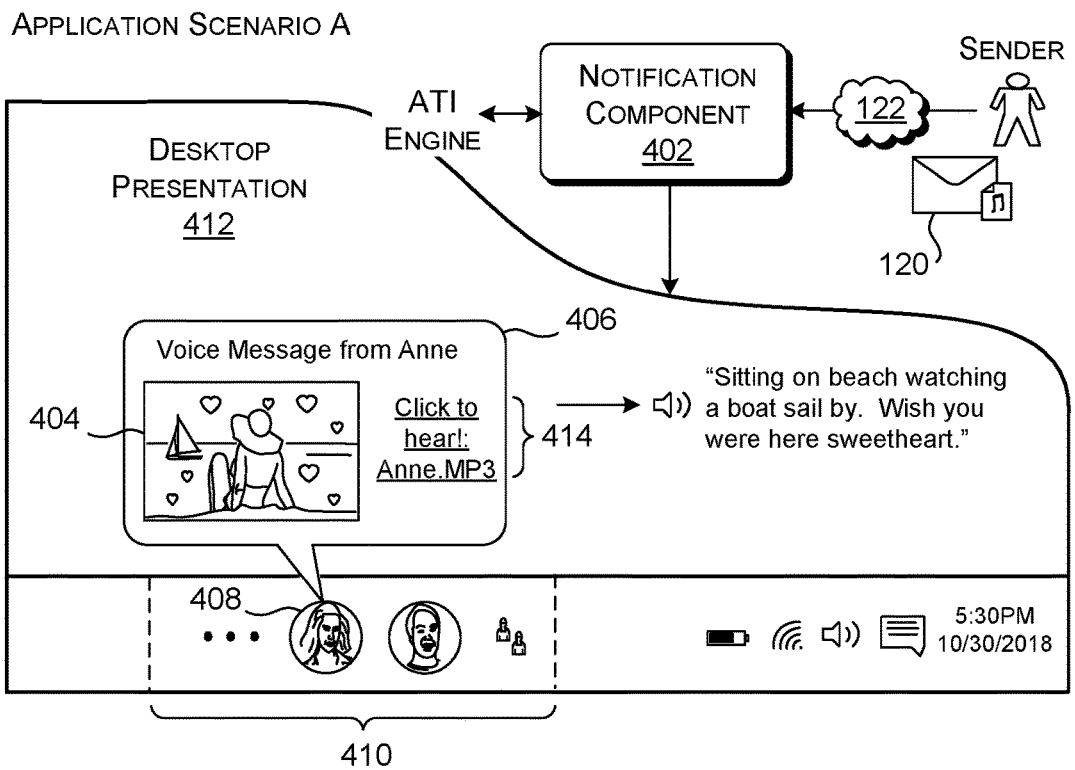
FIG. 4 shows a notification component, corresponding to one application that makes use of the ATI engine of FIG. 2.

This subsection provides examples of illustrative application components that can make use of the ATI engine 104 of FIG. 2. Beginning with FIG. 4, this figure shows a scenario in which a sender records a spoken voice message, "Sitting on beach watching a boat sail by. Wish you were here sweetheart." For example, the sender can record that message with her smartphone while sitting on a beach. Then assume that the sender transmits a message 120 containing the above-identified audio content to a recipient via a computer network 122. A notification component 402 installed on the recipient's computing device receives the message 120 and extracts its audio content. The notification component 402 then uses the ATI engine 104 to convert the audio content into an image 404. Assume that the image 404 shows a woman sitting on a beach watching a boat sail by. Here, the ATI engine 104 also adds a bubbling heart graphical overlay to match the affectionate content and vocal coloring of the audio content. In another case, the sender's computing device can include an application and associated ATI engine which converts the audio content into an image prior to sending it to the recipient.

In one merely illustrative case, assume that the notification component 402 displays an output presentation 406 which serves as a notification, alerting the recipient to the receipt of the message 120 from the sender. The output presentation 406 includes the image 404. More specifically, in this merely illustrative case, the output presentation 406 corresponds to a popup panel that appears above an icon 408 associated with the sender of the message. The icon 408, in turn, occurs within a people bar 410, which appears within a task bar of a desktop presentation 412.

By presenting the image 404 to the user in the above-described manner, the notification component 402 efficiently informs the recipient of the meaning and emotional content of the sender's voice message. Given this visual summary, the recipient need not perform the time-intensive task of listening to what may be a lengthy voice message from the sender. But the output presentation 406 also presents a link 414 or other graphical control which invites the recipient to listen to the actual audio content, if he or she chooses. Beyond the functional utility of these notifications, a recipient may be entertained by the way that the ATI engine 104 translates audio content into image content, even when the ATI engine 104 does not produce semantically perfect results.

Figure 5:
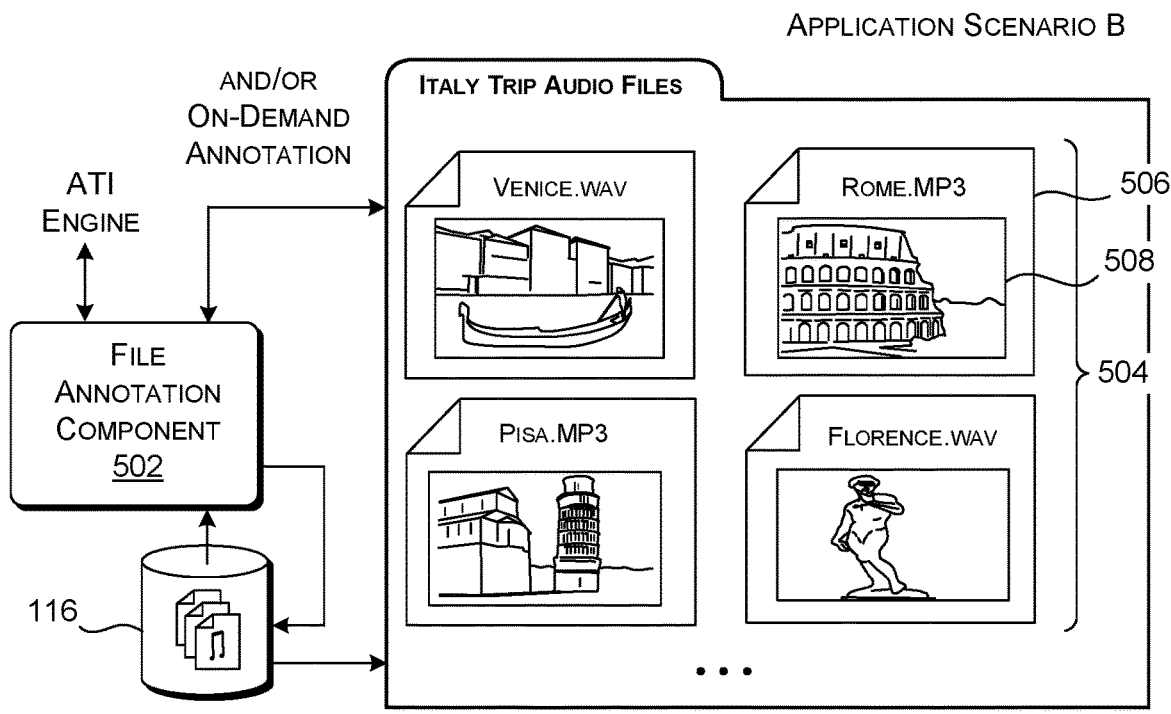
FIG. 5 shows a file annotation component, corresponding to another application that makes use of the ATI engine of FIG. 2.

FIG. 5 shows a file annotation component 502 that produces images to describe the audio content of files in a data store 116. The file annotation component 502 can then optionally associate the images with the files, such as by creating icons (or any other kind of visual identifiers) associated with the files that convey the images. For example, FIG. 5 shows a folder of icons 504 that the file annotation component 502 creates for four respective audio files.

In operation, the file annotation component 502 accesses an audio file, generates at least one image associated with the audio associated therewith, and creates an icon that incorporates the generated image(s). For instance, the file annotation component 502 produces a representative icon 506 that incorporates an image 508 of the Roman Coliseum because the associated audio file includes a spoken narrative regarding the Coliseum.

More specifically, in one manner of operation, the file annotation component 502 can replace a set of original file icons with new visually-descriptive file icons. The file annotation component 502 can then store the new visually-descriptive file icons in a data store. Thereafter, a user who wishes to view a file icon for a file will see the new visually-descriptive icon. The file annotation component 502 can perform this icon-replacement operation automatically or in response to an instruction from a user. In another manner of operation, the file annotation component 502 can, upon instruction from the user, generate and display the visually-descriptive file icons, but not persist the visually-descriptive file icons. Hence, the computing device(s) 106 will display the original icons to a user upon the user's subsequent request to view the icons (unless the user again makes the special request to view the visually-descriptive counterparts of these icons).

Figure 6:
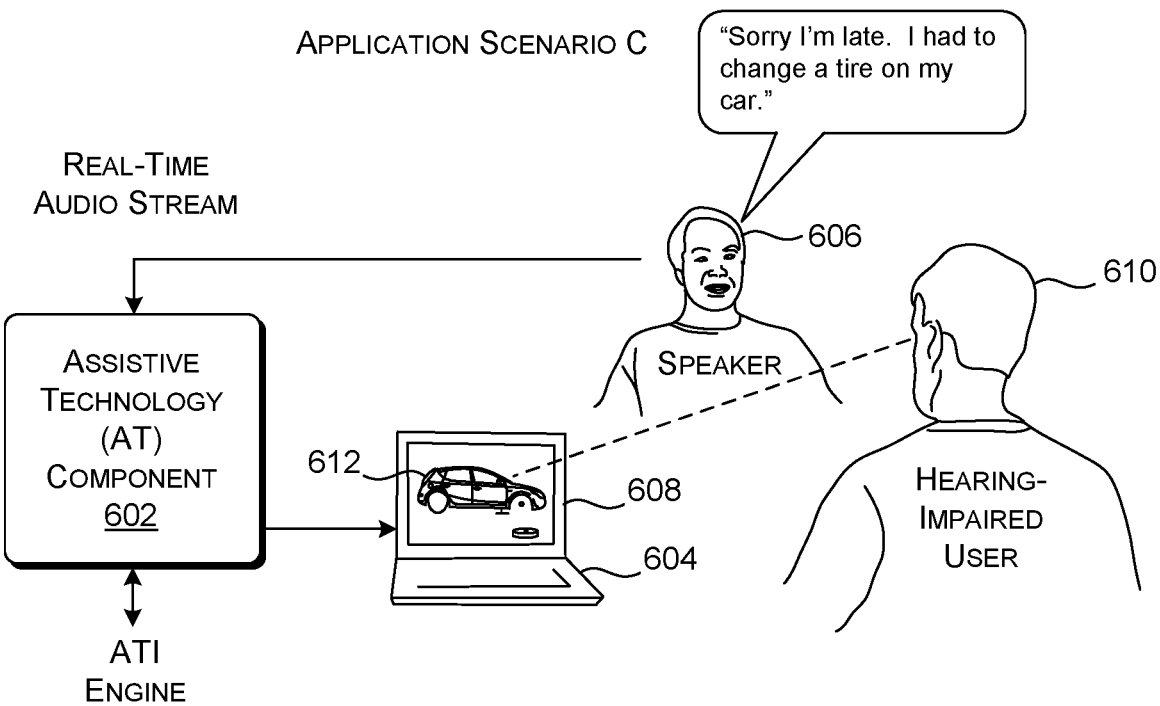
FIG. 6 shows an assistive technology component, corresponding to another application that makes use of the ATI engine of FIG. 2.

FIG. 6 shows an assistive technology (AT) component 602 that runs on a computing device 604. One or more microphones provided by the computing device 604 capture the real-time speech of a first person 606. In response, the AT component 602 generates a stream of images that describe the speech. The AT component 602 displays the sequence of images on a display device 608 of the computing device 604 (or on any other display device) as the first person 606 speaks. A second person 610 observes the images.

In one user scenario, the second person 610 may have an impairment which prevents him from hearing and/or understanding the speech of the first person 606. For example, the second person 610 may have a hearing-related, cognitive-related, and/or language-related impairment which prevents him from consuming the speech of the first person 606 in the same manner as a non-impaired listener. The AT component 602 helps this impaired second person 610 interpret the first person's speech. For example, the first person 606 is currently explaining to the second person 610 that he is late because he had to change a flat tire on his car. Simultaneously therewith, the AT component 602 shows an image 612 of a car with its front tire being replaced.

Even a non-impaired listener may benefit from the operation of the AT component 602, as it helps the listener to attend to a conversation in a distracting environment. In addition, or alternatively, a non-impaired listener may find the service provided by the AT component 602 entertaining.

Figure 7:
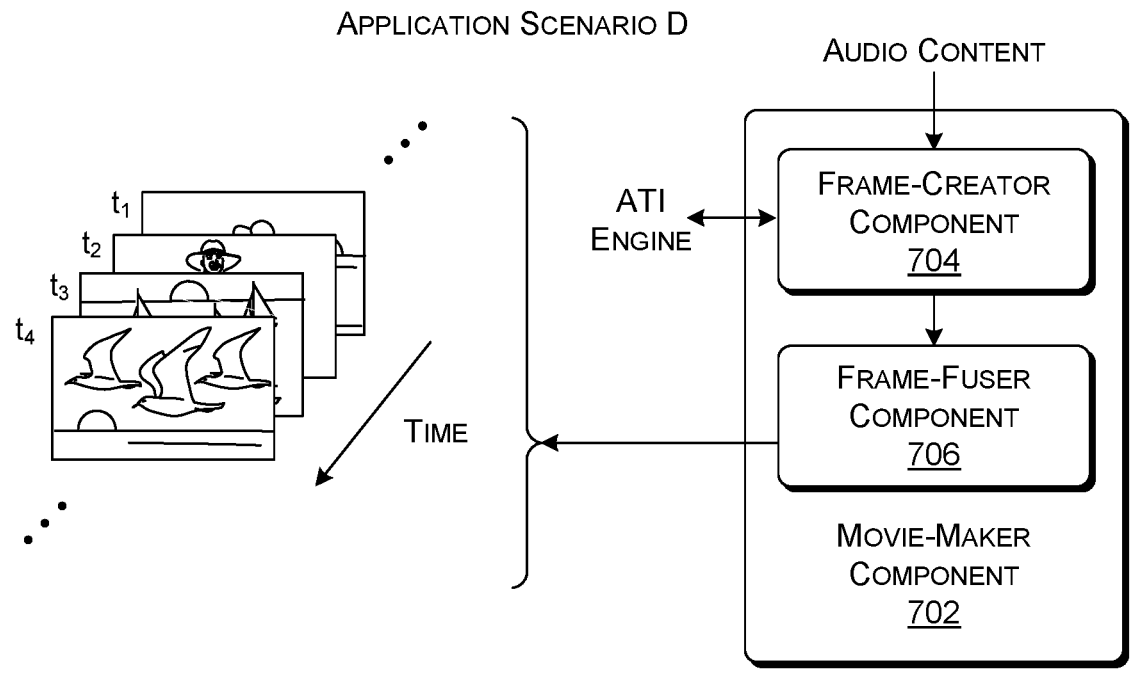
FIG. 7 shows a movie-maker component, corresponding to another application that makes use of the ATI engine of FIG. 2.

FIG. 7 shows a movie-maker component 702 that produces a sequence of images to annotate a stream of audio content, e.g., to produce the kind of sequence of images (302, 304, 306, 308) shown in FIG. 3. The audio content can originate from an audio file, the real-time speech of one or more people, and so on. More specifically, the movie-maker component 702 includes a frame-creator component 704 which produces a set of images associated with the audio content by interacting with the ATI engine 104. In addition, the movie-maker component 702 includes a frame-fuser component 706 which assembles the frames together to produce an aesthetically pleasing and informative output presentation. For example, when advancing from a first image to a second image in a sequence, the frame-fuser component 706 can produce a transition effect which operates to fade out a first image and fade in the second image.

In another case, the movie-maker component 702 can analyze the audio track of a movie, or any other media item that already includes image content. The movie-maker component 702 can present its synthesized images at the same time as the preexisting visual content of the movie, e.g., using a split-screen output presentation or a picture-in-picture presentation. A user may glean additional insight from the synthesized images. For example, assume that a movie provides a dramatic reenactment of a gladiator battle in the Coliseum. The ATI engine 104 can overlay synthesized images based on the audio content of the movie, which can reveal supplemental information about gladiators, the Coliseum, etc., to the possible end effect of pointing out historical errors in the preexisting visual content. In addition, the user may find the supplemental images entertaining.

Further note that the frame-creator component 704 need not create each frame of a sequence in isolation from other parts of an audio stream and the images associated therewith. For instance, note, with reference to FIG. 3, that the ATI engine 104 learns by processing a first spoken sentence that the speaker is on a beach wearing a hat at sunset. That information leads the ATI engine 104 to produce a first image 302 that represents these three semantic topics. The second spoken sentence does not include any reference to the beach, hats, or sunsets. But the ATI engine 104 can carry forward insight it learned in the first spoken sentence when producing the second image 304, e.g., by showing a person with a sunhat at sunset. To implement this behavior, the ATI engine 104 relies on a machine-trained model that takes into consideration the local and global features of a narrative. The global features capture insight that may have been gleaned from an earlier juncture in a narrative.

Alternatively, or in addition, when processing a current sentence in a narrative, the ATI engine 104 can treat its previously-generated images as input information for use in generating a current image. The ATI engine 104 will then attempt to achieve the dual objective of producing an image which matches both the current sentence and the previous image(s), to the extent that the previous image(s) are deemed pertinent to the current sentence. This behavior will ensure that the ATI engine 104 will depict a character in a narrative in a consistent fashion over the course of the narrative. That is, if the narrative is about a woman, the ATI engine 104 will visually depict the woman the same way in all images of a sequence.

The remaining subsections describe the individual engines that make up the ATI engine 104. Note that some subsections include equations that may use a symbol that appeared in one or more equations in previous subsections, but in different contexts. This is true, for instance, in equations that use the symbol $h_t$, which refers to hidden state information. As a general rule, the equations of each subsection are to be interpreted without reference to the equations set forth in any previous subsection.

A.3. Speech Recognizer Engine

Figure 8:
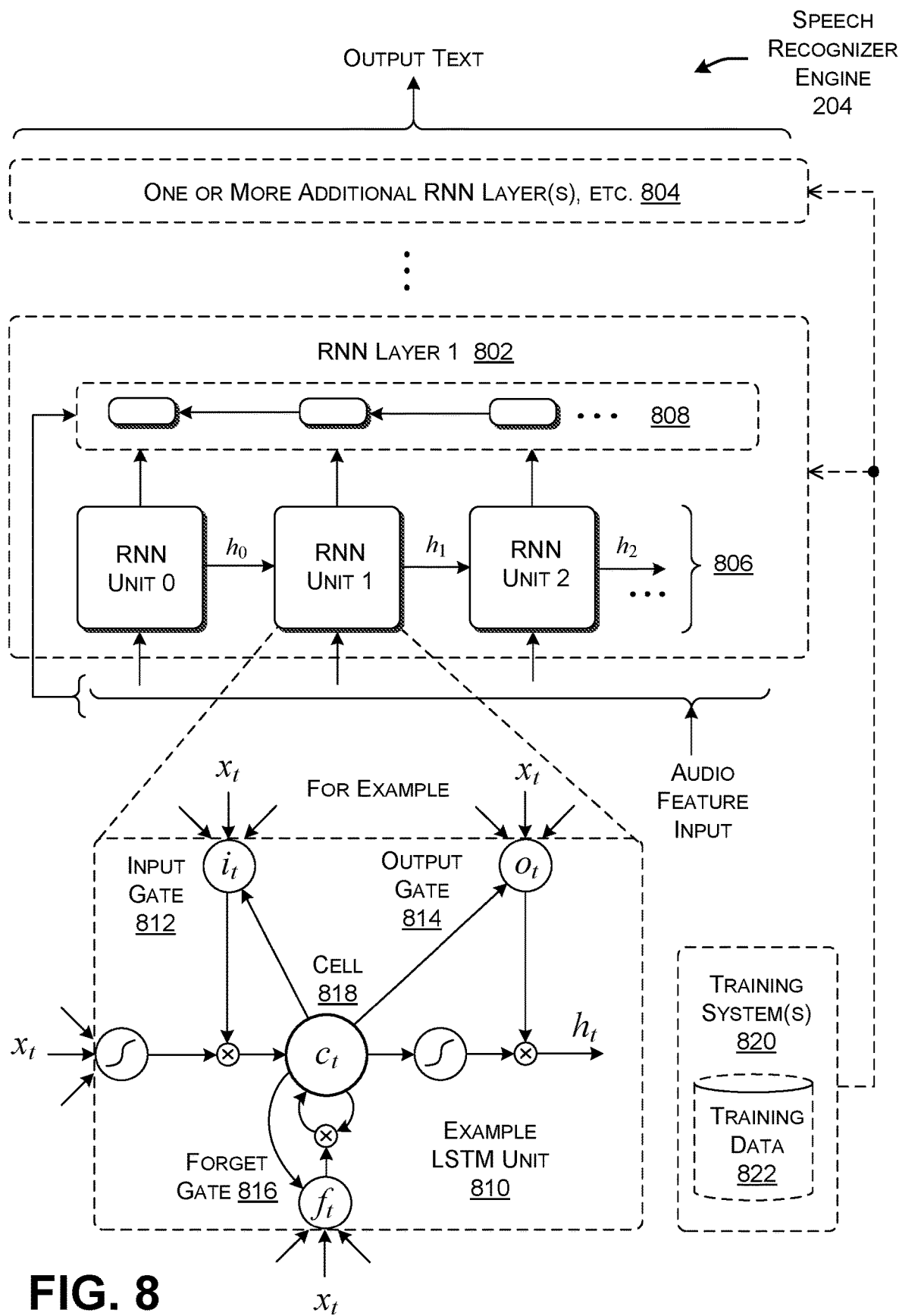
FIG. 8 shows one implementation of a speech recognizer engine, corresponding to one component of the ATI engine of FIG. 2.

FIG. 8 shows one implementation of the speech recognizer engine 204. The speech recognizer engine 204 converts a stream of audio features of any type(s) into text information, corresponding to a stream of text tokens (e.g., words). In the implementation described in this section, the speech recognizer engine 204 uses a Recurrent Neural Network (RNN) to achieve this task. But, as noted, the speech recognizer engine 204 can use other approaches to achieve the same result, such as another type of neural network, a Hidden Markov Model (HMM), etc.

The RNN can include one or more RNN layers, including RNN layers 802, . . . , 804. The representative RNN layer 802 includes at least one chain 806 of RNN units that feeds hidden state information in a first (forward) direction. Optionally, for a bidirectional RNN, the representative RNN layer 802 will include another chain 808 of RNN units that feed hidden state information in a second (backward) direction. Although not shown, the speech recognizer engine 204 can also include other kinds of layers (e.g., besides RNN layers). For instance, the speech recognizer engine 204 can include another type of neural network (such as a feedforward neural network) which processes the output result of a topmost RNN layer. In any event, a topmost layer of the speech recognizer engine 204 produces the final output, e.g., corresponding to a series of text tokens.

The representative forward chain 806 of RNN units includes RNN unit 0, RNN unit 1, RNN unit 2, etc. More specifically, the RNN can dynamically expand and contract its number of RNN units in each layer to accommodate the number of events in a sequence it seeks to analyze. Each RNN unit receives an input vector $x_t$ that describes an event, such as a feature vector that describes the audio features associated with a frame of the audio content. It uses its internal neural network logic to map the input vector $x_t$ to an RNN output vector $y_t$. Each RNN unit also receives an input hidden state vector $h_{t-1}$ from a preceding RNN unit (if any), and provides an output hidden state vector $h_t$ to a next RNN unit (if any) in the sequence of RNN units. Each RNN unit can also supply its RNN output vector $y_t$ to a corresponding next-tier RNN unit (if any) in the next RNN layer, where it serves as an input vector to that next-tier RNN unit.

In one implementation, each RNN unit generates it hidden state vector $h_t$ and its output vector $y_t$ according to the following equations:

$$h_t = \mathcal{H}(W_{xh}x_t + W_{hh}h_{t-1} + b_h) \quad (1)$$

$$Y_t = W_{hy}h_t + b_y \quad (2).$$

In these equation, t refers to a current instance, and x refers to an input vector that represents a token of the input sequence. $\mathcal{H}$ refers to a hidden layer function, such as a hyperbolic tangent function, sigmoid, etc. $W_{xh}$, $W_{hh}$, and $W_{hy}$ refer to machine-learned weighting matrices, and $b_h$ and $b_y$ refer to machine-learned bias vectors.

In the illustrative example of FIG. 8, each RNN unit corresponds to a Long Short-Term Memory (LSTM) unit. FIG. 8 shows also shows the architecture of one of the LSTM units, labeled as LSTM unit 810 in FIG. 8. The LSTM unit 810 includes an input gate 812, an output gate 814, a forget gate 816, and a cell 818. The LSTM unit 810 processes signals in a manner specified by the following equations:

$$i_t = \sigma(W_{xi}x_t + W_{hi}h_{t-1} + W_{ci}c_{t-1} + b_i) \quad (3)$$

$$f_t = \sigma(W_{xf}x_t + W_{hf}h_{t-1} + W_{cf}c_{t-1} + b_f) \quad (4)$$

$$c_t = f_t c_{t-1} + i_t \tan h(W_{xc}x_t + W_{hc}h_{t-1} + b_c) \quad (5)$$

$$o_t = \sigma(W_{xo}x_t + W_{ho}h_{t-1} + W_{co}c_t + b_o) \quad (6)$$

$$h_t = o_t \tan h(c_t) \quad (7).$$

In these equations, symbols i, o, $f$, and c represent vectors associated with the input gate 812, the output gate 814, the forget gate 816, and the cell 818, respectively. h again represents a hidden state vector associated with the hidden state. σ represents a logistic sigmoid function. The various weighting terms (W) and bias terms (b) again represent machine-learned parameter values, with subscripts associated with the above-defined symbols. Other implementations can use any other kind of RNN units besides LSTM units, such as Gated Recurrent Units (GRUs).

A training system 820 produces a model that governs the operation of the above-described RNN. The model consists of a collection of parameter values. The training system 820 operates on a set of training examples provided in a data store 822. In one implementation, each training example can include a pairing between a segment of audio content (and its associated audio features) and an accepted interpretation of the audio segment, expressed as a sequence of text tokens. The training system 820 can generate the model using any machine-learning technique, such as the gradient descent technique, etc. In this process, the training system 820 iteratively: (a) predicts output text using a model in its current state of development, for a given audio segment; (b) compares the predicted text with the given correct text associated with the audio segment, to generate an error measure; and (c) adjusts the parameter values of the model based on the error measure.

A.4. Sentiment Classification Engine

Figure 9:
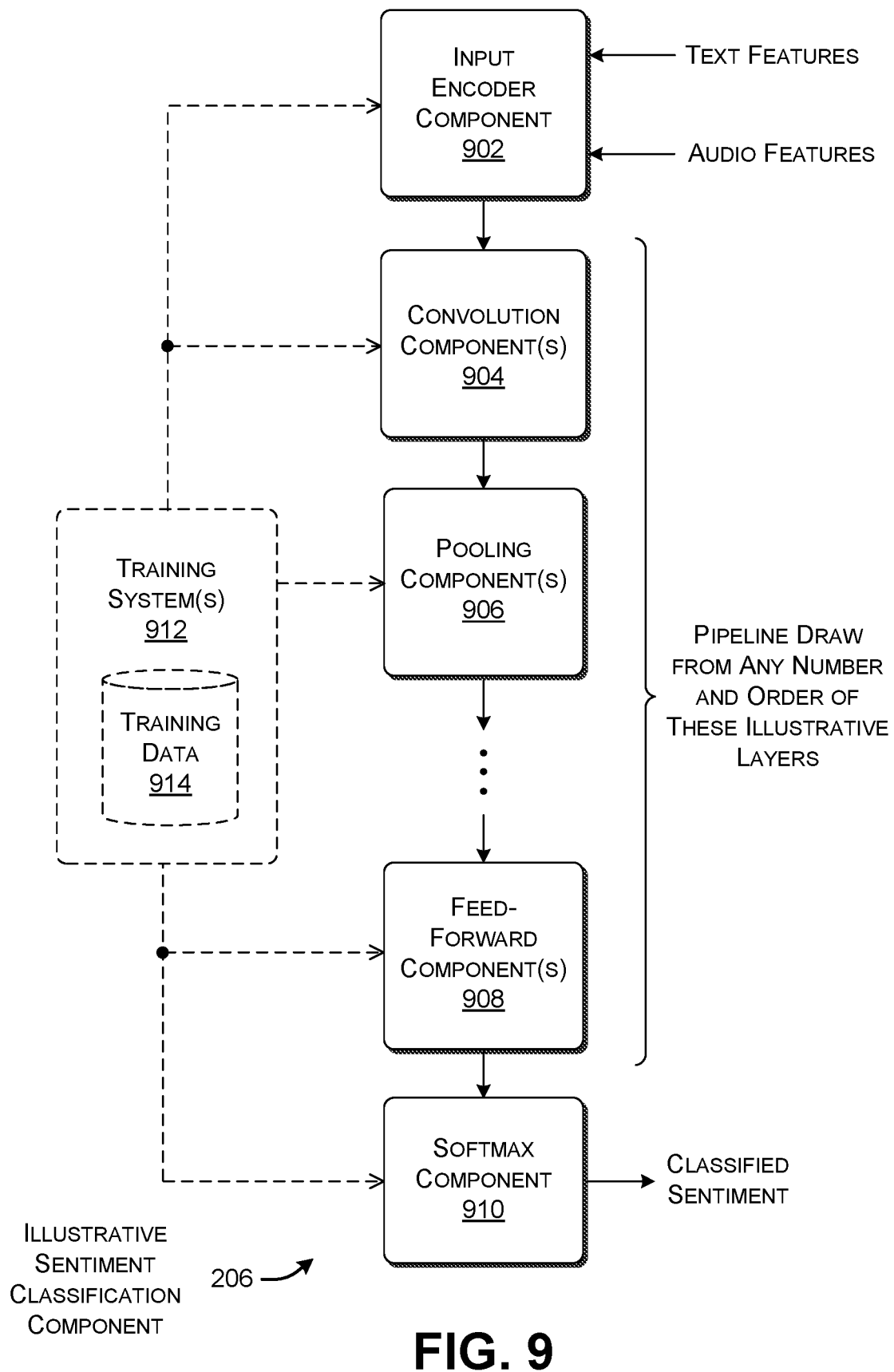
FIG. 9 shows one implementation of a sentiment classification component, corresponding to another component of the ATI engine of FIG. 2.

FIG. 9 shows one implementation of the sentiment classification engine 206. Here, the sentiment classification engine 206 corresponds to a Convolutional Neural Network (CNN) that maps input information describing the audio features and the text information into a classification result. The classification result can identify the emotion(s) expressed in a segment of audio content, and/or the opinion expressed by the content, and/or the polarity of an emotion or opinion expressed, etc. As noted above, other implementations of the sentiment classification engine 206 can use other machine-trained models to perform the same task, such as a decision tree model, an SVM model, etc.

The sentiment classification engine 206 performs analysis in a pipeline of stages. More specifically, in one case, the sentiment classification engine 206 uses a first pipeline to process the text information, and a second pipeline to process the audio features. A final-stage machine-trained classifier (not shown) can then map the conclusions of the first and second pipelines into a final output classification. In another implementation, the sentiment classification engine 206 performs a preliminary operation of mapping the text information and audio features into a same input space, e.g., using a neural network, etc. The sentiment classification engine 206 then processes the text information and the audio features in a single CNN pipeline.

To facilitate explanation, the CNN shown in FIG. 9 will be explained in the context of processing text information. Analogous operations apply to the processing of a stream of audio features. In the context of text information, an input encoder component 902 transforms each input text token into an appropriate form for further processing by the sentiment classification engine 206 (if not already given in that form by the speech recognizer engine 204). For example, in one merely illustrative case, the input encoder component 902 can transform each word into a vector which describes the trigrams that are present in the word. A trigram, in turn, includes each three-character sequence in the word. For example, the input encoder component 902 can map the word "sunset" to a vector having a 1 entry for each of the trigrams "sun," "uns," "nse," and "set," and a 0 entry for other trigram dimensions.

The sentiment classification engine 206 can process the input vectors provided by the input encoder component 902 in successive layers associated with one or more convolution components 904, one or more pooling components 906, one or more feed-forward components 908, a softmax component 910, and so on. That is, an environment-specific implementation of the sentiment classification engine 206 can include any number of these different layers, and can interleave these layers in any manner.

In the context of text-based processing, a convolution component can move an n-word window across the sequence of input word vectors. In doing so, it forms a series of vectors, each of which combines together the n words encompassed by the window at a given position. For example, if the input text reads, "All of a sudden, Tom stood up. . . . ," then the convolution component can form three-word vectors associated with "<s> All of," "All of a," "of a sudden," and so on (where the token "<s>" denotes the start of the sentence). More specifically, the convolution component can form the three-word vectors by concatenating the three trigram word vectors encompassed by the window. The convolution component can then transform the resultant three-word vector $(g_t)$ in any manner, e.g., by producing a hidden state vector $h_t$=tan $h(W_c g_t)$, where $W_c$ is a machine-learned weighting matrix.

In the context of text-based processing, a pooling component can reduce the dimensionality of a previous layer using any type of down-sampling strategy. For example, a max-pooling component can select a maximum value across each dimension of the hidden state vectors fed to it by a preceding convolution component, to form a global feature vector v. For instance, to provide a value at index i of the global feature vector v, the pooling component can select the maximum value across the input hidden state vectors at the same index i. In other words, $$v(i) = \max_{t=1,\ldots,T} \{h_t(i)\}, i = 1, \ldots T. \qquad (8)$$

Here, i refers to a particular element of the global feature vector v, and, correspondingly, in each of the input hidden state vectors, $h_t$. T is the total number of elements in the global feature vector.

A feed-forward component processes an input vector using a feed-forward neural network. In a single-layer case, an illustrative feed-forward component projects the global feature vector v into a continuous-valued concept vector y using a machine-learned semantic projection matrix $W_s$. That is, y=tan $h(W_s v)$. (More generally, the values in any layer j of a feed-forward network may be given by the formula, $z_j$=$f(W_j z_{j-1} + b_j)$, for j=2, . . . N. The symbol $W_j$ denotes a j-th machine-learned weight matrix, and the symbol $b_j$ refers to an optional j-th machine-learned bias vector. The activation function $f(x)$ can be formulated in different ways, such as the tan h function.) An optional softmax component 910 operates on the output of the preceding layers using a normalized exponential function, to generate final output information.

Here, the concept vector y specifies a sentiment associated with the input text, such as joy, fear, anger, worry, etc. As explained above, the sentiment classification engine 206 can use another CNN to map the audio features into another concept vector that identifies the sentiment. The sentiment classification engine 206 can then generate a final classification by forming a weighted sum of the two concept vectors, or by using another machine-trained model to process the two concept vectors, etc. Or a single CNN can process the text information and audio features at the same time.

A training system 912 iteratively produces values that govern the operation of at least the convolution component(s) 904 and the feed-forward component(s) 908, and optionally the pooling component(s) 906. These values collectively constitute a machine-trained model. The training system 912 can perform its learning by iteratively operating on a set of training examples in a data store 914. For instance, each training example may include an audio segment together with a label which identifies the sentiment(s) associated with the segment. In one implementation, the training system 912 can enlist human evaluators to listen to the audio segments and supply the labels, e.g., through any type of crowdsourcing strategy.

A.5. Image Creation Engine

FIG. 9 shows one implementation of a training system 1002 that produces a trained generator component 1004. In real-time use, the image creation engine 208 uses the trained generator component 1004 to convert text information and sentiment information into one or more images. The speech recognizer engine 204 supplies the text information, while the sentiment classification engine 206 provides the sentiment information. The trained generator component 1004 can optionally take into consideration other factors, such as the image content associated with previous images that it has generated for the same input audio content, e.g., reflecting an earlier juncture of a spoken narrative.

Here, the training system 1002 includes a generative adversarial network (GAN) system 1006. The GAN system 1006, in turn, includes the abovementioned generator component 1004-t (wherein the trailing "t" indicates that this component is in a training-phase state), together with a discriminator component 1008. The generator component 1004-t is defined by a set of parameter values (G($\theta$)), while the discriminator component 1008 is defined by another set of parameter values (D($\theta$)). A training component 1010 successively updates the two sets of parameter values to achieve a training objective, described below.

In operation, the generator component 1004-t receives generator input information that describes the audio content (e.g., text information and sentiment information, etc.), together with an instance of random information. The generator component 1004-t maps these two inputs into at least one synthetic image. The synthetic image can be referred to as a simulated, false, or "fake" image because it may have no preexisting counterpart in a data store of real images which are provided through some other process(es). The discriminator component 1008 receives the generator input information and a synthetic image created by the generator component 1004-t. It then determines whether the synthetic image is a good match for the generator input information. In other words, the discriminator component 1008 may be viewed as deciding whether the synthetic image is real (reflecting a real visual depiction of audio content) or fake (reflecting a computer-generated attempt to depict the audio content).

The training component 1010 can train the generator component 1004-t and the discriminator component 1008 in two respective phases. To train the generator component 1004-t, the training component 1010 repeats the following operations: (1) the generator component 1004-t generates a synthetic image; (2) the discriminator component 1008 determines whether the synthetic image is genuine or fake; and (3) the training component 1010 adjusts the parameter values G($\theta$) of the generator component 1004 based on the classification result of the discriminator component 1008.

The training component 1010 can train the discriminator component 1008 based on a plurality of training examples in a data store 1012. Each training example bearing a "true" label contains a pairing of audio content and image content that is considered matching, e.g., because the image content correctly describes the audio content. The training system 1002 can cull these trues examples from various sources, such as movie items produced by a video camera. Each movie item couples instances of audio content and image content in a way that is considered correct or truthful by definition, on a frame-by-frame basis. Each training example bearing a "false" label contains a pair of audio content and image content that is considered incorrect, e.g., because the image content does not accurately describe the audio content. The training system 1002 can randomly pair image content with audio content to produce these false examples, based on the presumption that the random pairing will almost always be incorrect. The training component 1002 uses the thus-compiled training set to produce the parameter values D($\theta$) of the discriminator component 1008 via any machine-learning technique, such as gradient descent. In doing so, the training system 1002 attempts to reduce the discriminator component's rate of error in discriminating between true and false images.

More generally, the training component 1010 iteratively improves the ability of the generator component 1004-t to produce synthetic images that resemble "real" or truthful visual depictions of audio content. The training component 1010 also iteratively improves the ability the discriminator component 1008 to distinguish between real and fake images. As an end result, the generator component 1004 will eventually produce synthetic images that are virtually indistinguishable from the real images. Once this objective is achieved, the training component 1010 will install the trained generator component 1004 (as defined by the trained set of parameter values G($\theta$)) in the image creation engine 208.

The GAN system 1006 is said to be "adversarial" because the generator component 1004-t attempts to "fool" the discriminator component 1008, while the discriminator component 1008 attempts to thwart that deception by improving its ability to discriminate between true and fake images. In one implementation, the training component 1010 performs its training in an offline training process on a periodic basis. In another implementation, the training component 1010 continuously updates the generator component 1004 as a background process.

Figure 10:
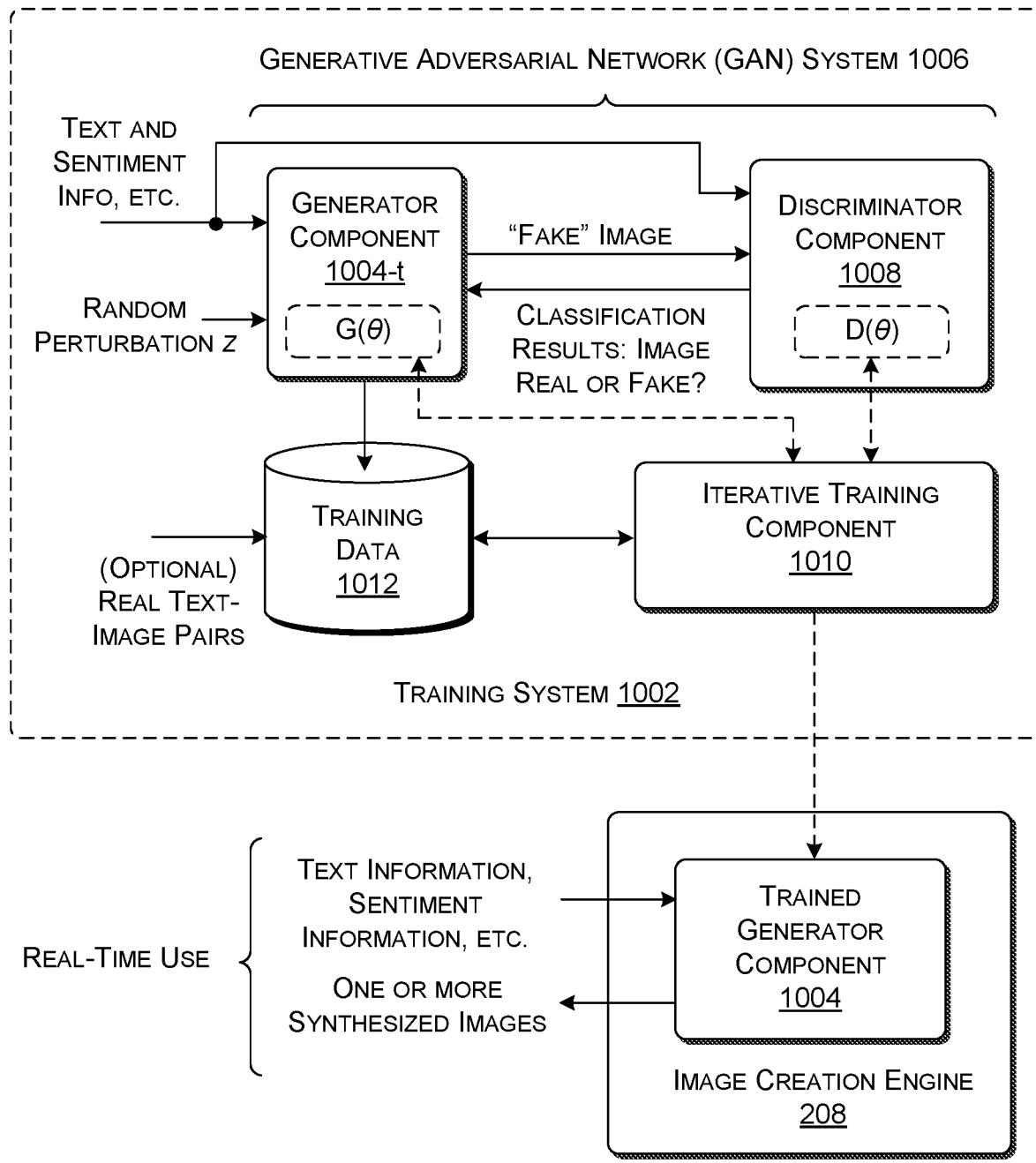
FIG. 10 shows one implementation of an image creation engine, corresponding to another component of the ATI engine of FIG. 2.
Figure 11:
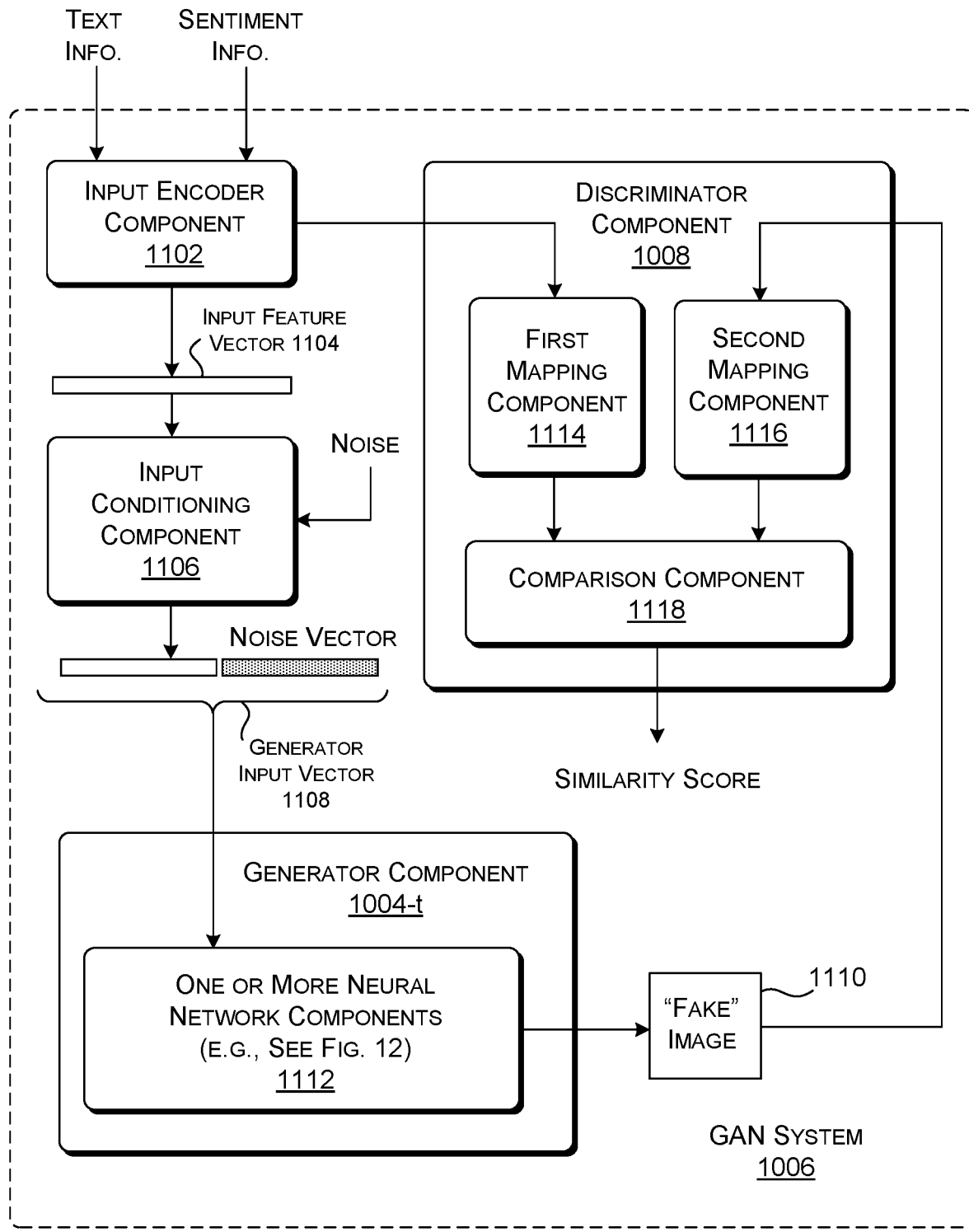
FIG. 11 show one implementation of the training system of FIG. 10.

FIG. 11 show one implementation of the GAN system 1006 of FIG. 10. The GAN system 1006 includes an input encoder component 1102 for mapping generator input information (corresponding to text information and sentiment information) into an input feature vector 1104, e.g., using a neural network of any type, such as an RNN, etc. An input conditioning component 1106 produces a generator input vector 1108 by concatenating the input feature vector 1104 with a noise vector. The generator component 1004-t maps the generator input vector 1108 into a synthesized image 1110 using one or more neural network components 1112, or, more generally, any machine-trained generative model.

The discriminator component 1008 may include two mapping components (1114, 1116) that map the input feature vector 1104 and the synthesized image 1110, respectively, into a same semantic space. A comparison component 1118 determines a distance between the input feature vector 1104 and the synthesized image 1110 in the semantic space. For example, the two mapping components (1114, 1116) can produce two concept vectors in the semantic space. The comparison component 1118 can use a cosine similarity metric or any other distance measure to determine the distance between the two vectors in the semantic space. The distance reflects the similarity between the input feature vector 1104 and the synthesized image 1110, which, in turn, indicates the extent to which the synthesized image 1110 is considered an accurate visual depiction of the input feature vector 1104.

Each mapping component can use any logic to transform its input into a concept vector, such as a Convolutional Neural Network (CNN). For instance, the first mapping component 1114 can use the CNN architecture described in FIG. 9 to map the input feature vector 1104 into a concept vector. (Note that the discriminator component 1008 can omit the first mapping component if the input encoder component 1102 has already transformed the text information and sentiment information into a concept vector in the semantic space.)

The second mapping component 1116 can also use the same CNN architecture. In the context of image processing, a convolution component moves an n×m kernel across an input image (where "input image" in this general context refers to whatever image is fed to the convolution component). At each position of the kernel, the convolution component generates the dot product of the kernel values with the underlying pixel values of the image. The convolution component stores that dot product as an output value in an output image at a position corresponding to the current location of the kernel. More specifically, the convolution component can perform the above-described operation for a set of different kernels having different machine-learned kernel values. Each kernel corresponds to a different pattern. In early stages of processing, a convolutional component may apply kernels that serve to identify relatively primitive patterns (such as edges, corners, etc.) in the image. In later stages, a convolutional component may apply kernels that find more complex shapes (such as shapes that resemble human noses, eyes, trees, etc.).

In the context of image processing, a pooling component moves a window of predetermined size across an input image (where, again, the input image corresponds to whatever image is fed to the pooling component). The pooling component then performs some aggregating/summarizing operation with respect to the values of the input image enclosed by the window, such as by identifying and storing the maximum value in the window, generating and storing the average of the values in the window, etc.

A feed-forward component in the second mapping component 1116 can begin its operation by forming a linear input vector. It can perform this task by concatenating the rows or columns of the input image (or images) that are fed to it, to form a single input vector. It then transforms the input vector using one or more feed-forward layers in the manner described above.

Figure 12:
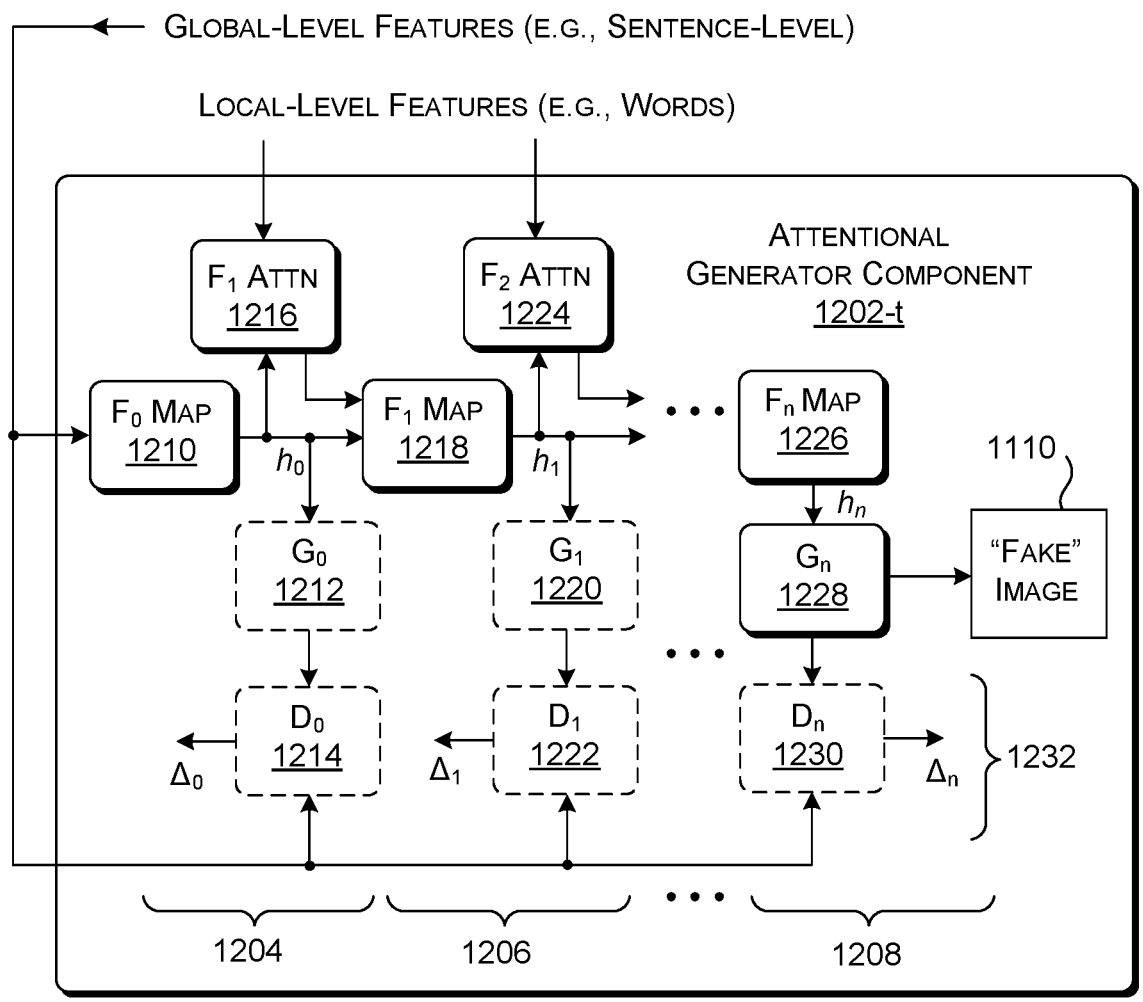
FIG. 12 shows one implementation of a generator component, which is a component of the training system of FIG. 11.

FIG. 12 shows one implementation of a generator component 1202-t which can be used in the GAN system 1006 of FIG. 11. Again, the trailing "t" indicates that the generator component 1202 plays a role in a training phase, and is the counterpart of a trained generator component that is produced at the outcome of the training phase. The fully-trained generator component has all of the components illustrated in FIG. 12, except the components with dashed-line borders (as described below).

The generator component 1202-t processes generator input information that is separated into global-level features and local features. The global level features may be represented by the above-described generator input vector 1108. The local-level features may correspond to a matrix of word vectors that describe the individual words and sentiments identified by the speech recognizer engine 204 and the sentiment classification engine 206, respectively. By giving attention to the local features associated with audio content, the generator component 1202-t, once properly trained, can better ensure that it generates a synthesized image 1110 that adequately represents its individual concepts. For example, the audio at time $t_1$ in the example of FIG. 3 includes the sentence, "I sat on the beach at sunset enjoying the peaceful sea in my new sunhat." Once properly trained, the generator component 1202-t can generate a synthesized image 302 that represents the main components of this utterance, including the beach, the ocean, a boat, a hat, etc.

To achieve the above effect, the generator component 1202-t includes a plurality of processing stages (1204, 1206, . . . , 1208) devoted to generating image content that emphasizes different aspects of the eventually-generated synthesized image 1110. The last processing stage 1208 produces the final synthesized image 1110. Each processing stage includes a set of processing components that transform input information into output information. In one implementation, at least some of these processing components can be implemented as separate machine-trained neural networks of any type(s).

Referring first to a preliminary stage 1204, a preliminary-stage mapping component ($F_0$ Map) 1210 transforms the global-level features into preliminary-stage hidden state information $h_0$. A preliminary-stage generator component ($G_0$) 1212 maps the preliminary-stage hidden state information $h_0$ into a preliminary-stage synthesized image (not shown). A preliminary-stage discriminator component ($D_0$) 1214 compares the preliminary-stage synthesized image with the global-level features to determine a degree to which the preliminary-stage synthesized image is a good match for the global-level features. Note that the preliminary-stage generator component 1212 and the preliminary-stage discriminator component 1214 serve a role in the context of training the generator component 1202-t, but do not play a function in the generator component 1202-t once it is fully trained and deployed in the image creation engine 208.

The first processing stage 1206 includes a first-stage attention component ($F_1$ Attn) 1216 which generates attention information. The attention information corresponds to a word-context vector for each sub-region of the synthesized image under development. For example, the first column the preliminary-stage hidden state information $h_0$ reflects feature values associated with a first sub-region of the synthesized image. Using machine-trained weights, the first-stage attention component 1216 generates a word-context vector for this first sub-region that reflects the relevance of individual words and sentiments to this first sub-region.

A first-stage mapping component ($F_1$ Map) 1218 maps the preliminary-stage hidden state vector $h_0$ and the output of the first-stage attention component 1216 into first-stage hidden state information $h_1$. A first-stage generator component ($G_1$) 1220 produces a first-stage synthesized image (not shown), and a first-stage discriminator component ($D_1$) 1222 compares the first-stage synthesized image with the global-level features.

Assume that the generator component 1202-t only includes three processing stages. In that case, a second-stage attention component ($F_2$) 1224 performs the same function as the second-stage attention component 1224, but with respect to the hidden state information $h_1$ produced by the first processing stage 1206. A final-stage mapping component ($F_n$ Map) 1226 maps the first-stage hidden state information $h_1$ and the output of the final-stage attention component 1224 into a final-stage hidden state information $h_n$. A final-stage generator component ($G_n$) 1228 produces the final synthesized image 1110, and a final-stage discriminator component ($D_n$) 1230 compares the final-stage synthesized image with the global-level features. Note that the discriminator components 1232 shown in FIG. 12 play a role in training the generator component 1202-t, but not in the real-time use of the trained generator component 1202-t in the image creation engine 208. Similarly, the earlier-stage generator components (1212, 1220, . . . ) do not serve a purpose in the real-time use of the trained generator component 1202-*t*.

The discriminator component 1008 shown in FIG. 10 can likewise be configured to compare the generator input information and the synthesized image 1110 on a region-specific and word-specific basis. For example, using machine-trained weights, the discriminator component 1008 can generate a region-context vector for each word and each sentiment of the generator input information, which reflects the relevance of synthesized image's sub-regions to this word. The discriminator component can then determine the cosine similarity between each region-context vector and its associated word vector. The discriminator component 1008 can produce a final score for the entire synthesized image based on a weighted sum of the word-specific cosine similarity measures. The discriminator component 1008 does not duplicate the function of the per-stage discriminator components 1232 because the per-stage discriminator components 1232 are used for training on a per-stage granularity, and with respect to the global-level features (not the individual words).

Figure 13:
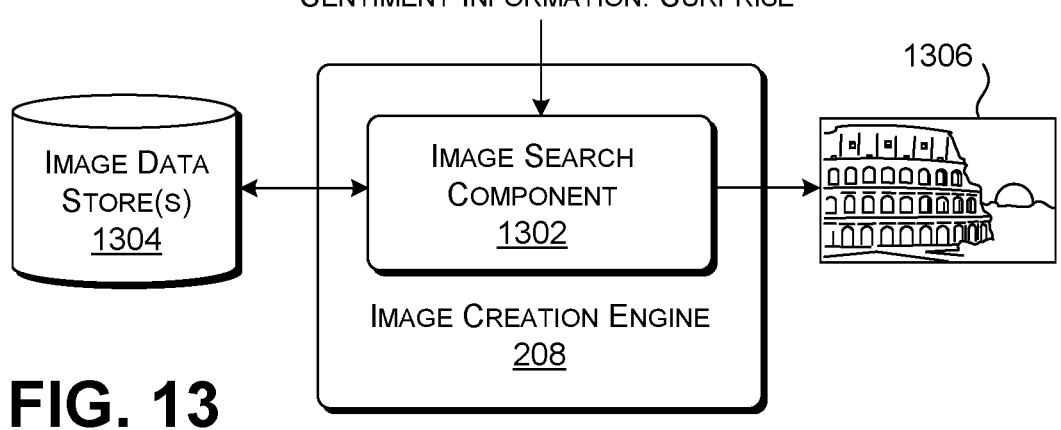
FIG. 13 shows another implementation of the image creation engine used in the ATI engine of FIG. 2.

FIG. 13 shows another implementation of the image creation engine 1202 used in the ATI engine 104 of FIG. 2. In this implementation, an image search component 1302 retrieves one or more images that match the generator input information, rather than synthesizing the image(s) from scratch, as in the above-described implementations. One or more data stores 1304 can store the candidate images. In one case, the images in the data store(s) 1304 represent locally-stored image resources. Alternatively, or in addition, the candidate images may represent a distributed collection of image resources, e.g., provided by various Internet-accessible sites.

In one implementation, the image search component 1302 can perform its search and retrieval function by generating a first concept vector that describes the generator input information. It can then generate a second concept vector that describes each candidate image (if that concept vector has not already been generated and stored). For instance, a CNN architecture of the type described above can be used to perform these tasks. The image search component 1302 then compares the first vector with each second vector for each candidate image (e.g., using a cosine similarity comparison), to find the candidate image that is most similar to the concepts and sentiments expressed by the generator input information. In the merely illustrative example shown in FIG. 13, the image search component 1302 receives the text information that reads, in part, "I visited the Coliseum at sunrise," and sentiment information that expresses "surprise." The image search component 1302 maps this input information into a concept vector, and uses that concept vector to find a preexisting image 1306 that depicts the Roman Coliseum at sunrise. In other implementations, the image search component 1302 can retrieve a video item instead of, or in addition to, a static image item.

As a final clarification that applies to any implementation of the image creation engine 208, note that a spoken sentence may form a part of a larger spoken narrative. In generating an image for any individual sentence (or part thereof), the image creation engine 208 can take its larger context into account in different ways. First note that the speech recognizer engine 204 and the sentiment classification engine 206 can consider the contextual aspects of the overall narrative when interpreting an individual sentence. For instance, the speech recognizer engine 204 can perform this task by virtue of the capacity of its RNN units to preserve aspects of previously encountered audio content. Hence, the input information that is fed to image creation engine 208 can implicitly take into account aspects of the overall narrative, as observed at a current point in time.

In addition, the image creation engine 208 can perform processing which takes into account previous images that it has already generated. For instance, at any given time in a narrative, the generator input information fed to the image creation engine 208 can include image content associated with previous images that it has created in the scope of the narrative. As described above, this will help ensure that people and objects look the same in the images produced by the image creation engine 208 over the course of the narrative. In another implementation, the image creation engine 208 generates a set of images for an entire narrative at the same time, e.g., by delaying the generation of the images until the narrative has completed. This will allow the image creation engine 208 to extract insight from all junctures of the narrative when generating an image for any given juncture of the narrative. For example, in the context of FIG. 3, the end of the narrative may clarify the visual characteristics of the particular beach that the user is sitting on, e.g., whether it has white sand or gray pebbly sand, etc. The image creation engine 208 can incorporate that knowledge in its generation of the first image 302 in the narrative.

A.6. Style Transfer Engine

Figure 14:
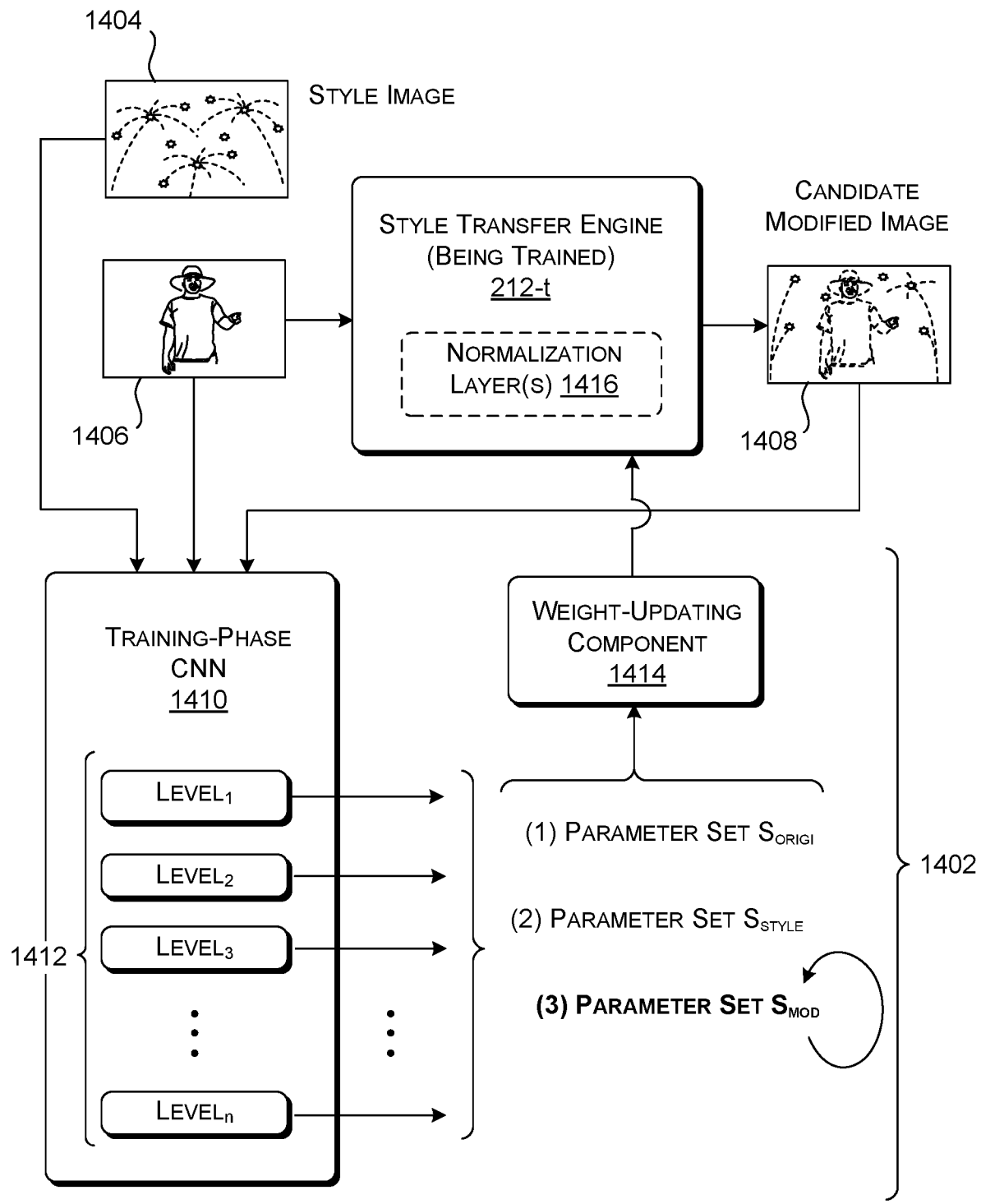
FIG. 14 shows a first implementation of a style transfer engine, which is another component of the ATI engine of FIG. 2.

FIG. 14 shows a first implementation of the style transfer engine 212. The style transfer engine 212 receives one or more original images from the image creation engine 208 and transforms them in such a manner that they reflect one or more style images. The style transfer engine 212 selects the style image(s), in turn, based on the sentiment information output by the sentiment classification engine 206. The style transfer engine 212 is an optional component. If omitted, the image(s) provided by the image creation engine 208 represents the final output of the ATI engine 104.

By way of overview, in one non-limiting implementation, a training system 1402 extracts the low-level texture-related features associated with a style image 1404. The training system 1402 similarly extracts high-level features associated with an original image 1406. The training system 1402 then attempts to train a style transfer engine 212-*t* such that it can produce a modified image 1408 that duplicates both the low-level aspects of the style image 1404 and the high-level aspects of the original image 1406. The style transfer engine 212-*t* refers to a version of a style transfer engine 212 under training. In one implementation, the style transfer engine 212-*t* can correspond to a Convolutional Neural Network (CNN) of any type.

More specifically, in one implementation, the training system 1402 uses another CNN 1410 that has already been trained, which serves as a loss-analysis network, to produce different sets of classifier activation values. That is, the CNN 1410 can include, for example, the type of image-processing layers 1412 described above (e.g., one or more convolution components, one or more pooling layers, one or more feed-forward neural network layers, etc.). The training system 1402 extracts the activation values produced by the different layers, corresponding to the output values of these layers, to collectively produce a first set of activation values ($S_{orig}$). The training system 1402 can perform the same operation with respect to the style image 1404 to produce a second set of activation values ($S_{style}$). Finally, the training system can use the style transfer engine 212-*t*, in its current state of development, to map the original image 1406 into the modified image 1408. The training system 1402 then uses the CNN 1410 to produce a third set of activation values ($S_{mod}$) based on the modified image 1408.

A weight-updating component 1414 then determines the extent to which the modified image 1408 preserves the low-level features of the style image 1404 and the high-level features of the original image 1406. To compute the modified image's loss $\mathcal{L}_{style}$ with respect to the low-level content of the style image 1404, the weight-updating component 1414 can compute:

$$\mathcal{L}_{style} = \sum_{m \in style} \beta_m \|G(\eta_m(\text{mod})) - G(\eta_m(\text{style}))\|^2. \quad (9)$$

In this equation, $n_m(\text{mod})$ is the subset of activation values from $S_{mod}$ associated with layer m, and $n_m(\text{style})$ is the subset of activation values from $S_{style}$ associated with layer m. $G(n_m(\text{mod}))$ and $G(n_m(\text{style}))$ are the Gram matrix transformations of $n_m(\text{mod})$ and $n_m(\text{style})$, respectively, for layer m. A Gram matrix is produced by multiplying a matrix of values, for a given layer, with its own transpose. $\beta_m$ is a modifying constant for level m.

Similarly, to compute the modified image's loss $\mathcal{L}_{orig}$ with respect to the high-level content of the original image 1406, the weight-updating component 1414 computes:

$$\mathcal{L}_{orig} = \sum_{m \in orig} \alpha_m \|\eta_m(\text{mod}) - \eta_m(orig)\|^2. \quad (10)$$

In this equation, $n_m$ is the subset of activation values associated with $S_{orig}$ for layer m, and $\alpha_m$ is a modifying constant for layer m.

The weight-updating component 1414 then adjusts the weights of the style transfer engine 212-*t* with the object of reducing a total loss, defined as the weighted sum of $\mathcal{L}_{style}$ and $\mathcal{L}_{orig}$. Overall, the training system 1402 repeats the entire process one or more times, and with respect to a large number of different original images in a training set. That process includes, for each original image: (1) generating a new modified image 1408 with the current model weights of the style transfer engine 212-*t*; (2) generating an updated set of activation values $S_{mod}$ for the new modified image 1408 using the CNN 1410; (3) re-computing $\mathcal{L}_{style}$ and $\mathcal{L}_{orig}$ that take account of the new activation values $S_{mod}$; and (4) updating the model weights of the style transfer engine 212-*t* being trained based on the new $\mathcal{L}_{style}$ and $\mathcal{L}_{orig}$. Eventually, the training system 1402 will produce a model that enables the style transfer engine 212-*t* to generate a modified image 1408 which preserves both the low-level content of the style image 1404 and the high-level content of the original image 1406, to a desired degree of precision. The ATI engine 104 may thereafter apply the trained style transfer engine 212 to any input original image.

Note that the explanation above has been framed in the context of a single style image 1404. In one implementation, the training system 1402 can repeat the same training operation for different respective style images associated with different sentiments, to produce a set of sentiment-specific transformation models. In the runtime phase of operation, the style transfer engine 212 will invoke the model that is appropriate for the input sentiment information, e.g., by invoking a first model if the sentiment information indicates joy, and a second model if the sentiment information indicates anger, etc.

In another implementation, the training system 1402 can expand the single-style model described above such that it is capable of generating modified images for a set of different sentiments and associated style images. To achieve this effect, given an already-trained model for the style image 1404, the training system 1402 further trains the instance normalization layer(s) 1416 of the style transfer engine 212-*t* for a set of new style images associated with different sentiments. That is, adequate output results are achieved without retraining every layer of the style transfer engine 212-*t* for different styles; the parameter values associated with those other layers may remain unchanged, and therefore may be shared across different sentiments.

Figure 15:
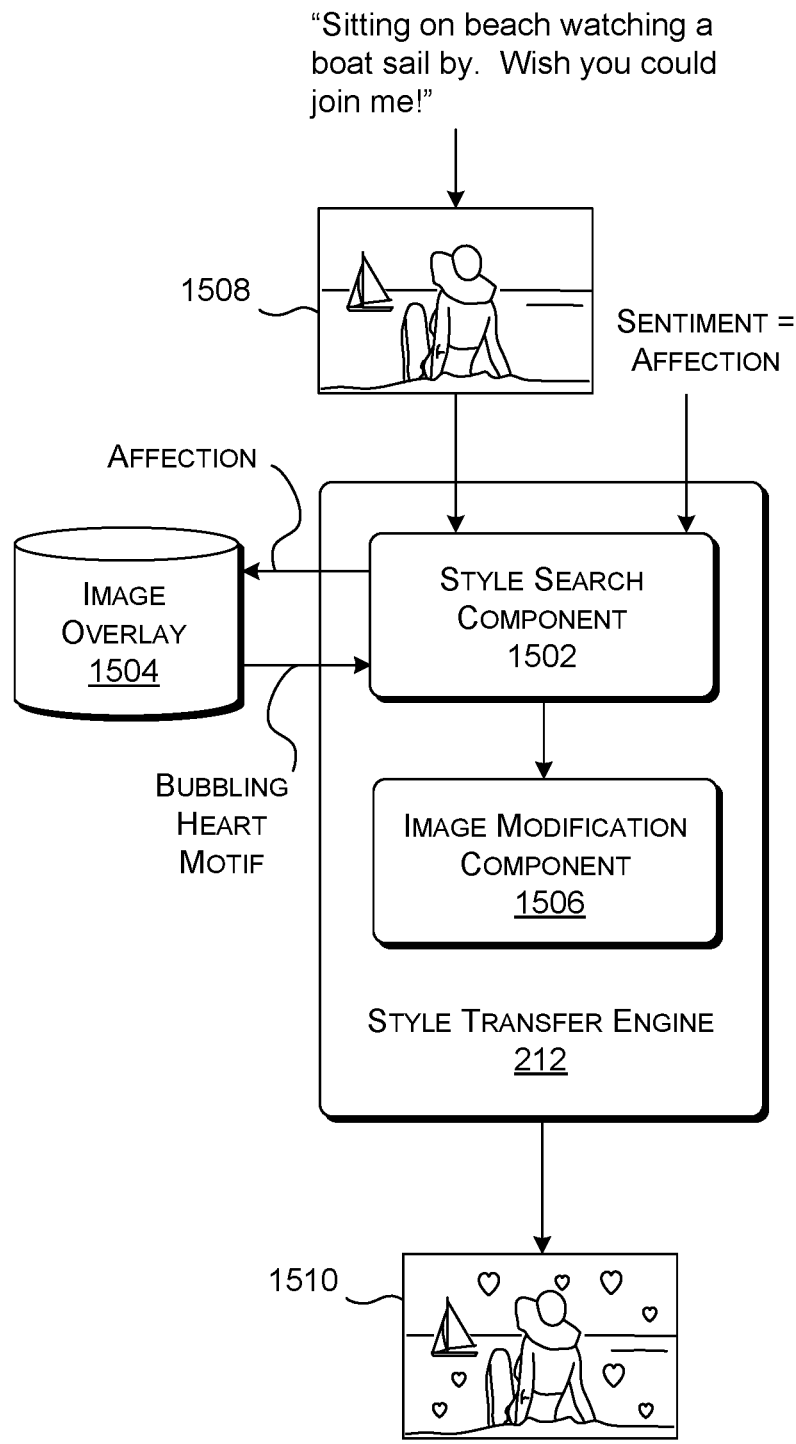
FIG. 15 shows a second implementation of the style transfer engine.

FIG. 15 shows a second implementation of a style transfer engine 212. Here, the style transfer engine 212 receives the sentiment information as an input value. Here, the sentiment information indicates that the audio content expresses affection. A style search component 1502 then retrieves, accesses, or otherwise identifies appropriate style information in a data store 1504 that includes a set of available instances of style information. For example, for the sentiment of affection, the style search component 1502 can retrieve or otherwise identify an animated overlay that produces bubbling hearts. Such an overlay can correspond to an animated Graphics Interchange Format (GIF) content item, an Animated Portable Network Graphics (APNG) content item, a looping video snippet, etc. Or the style search component 1502 can retrieve or otherwise identify a static heart image. An image modification component 1506 then applies the identified style information to the original image, e.g., by overlaying a bubbling heart overlay onto an original image 1508 to produce a modified image 1510. Any overlay can have a transparency level that renders it semi-transparent, allowing a user to see the original image content beneath it.

Regardless of whether the style transfer engine 212 of FIG. 14 or 15 is used, it can be configured to operate at different rates. In one manner of operation, the style transfer engine 212 modifies every original image produced by the image creation engine 208. That is, the style transfer engine 212 and the image creation engine 208 work in lockstep at the same rate. In another implementation, the image creation engine 208 can generate new images at a rate of $r_1$, while the style transfer engine 212 can modify the style of the output image content at a rate $r_2$, where $r_2 > r_1$. For example, the image creation engine 208 can produce a single image to represent an entire sentence (or any other unit of analysis) of a narrative. The style transfer engine 212 can dynamically modify the appearance of this single image based on one or more audio characteristics of the audio content over the course of the sentence as it is read, such as the loudness of a speaker's voice, the timber, etc. In addition, or alternatively, the style transfer engine 212 can dynamically modify the single image at the same time that emotionally-suggestive keywords (e.g., "dearest," "sweetheart," "angry," "surprised," etc.) are spoken in a sentence. In the context of FIG. 15, the style transfer engine 212 can dynamically vary the number of bubbling hearts depending on some characteristic of the speaker's voice which correlates with a degree of affection, such as softness or seductiveness of voice. This manner of operation gives a viewer the impression that the ATI engine 104 is dynamically responding to changes in the audio characteristics of the audio content. But the style transfer engine 212 can achieve this effect without performing the processor-intensive operation of generating new synthetic images during the course of a sentence. In this manner of operation, the style transfer engine 212 receives input information from the sentiment classification engine 206 over the course of the sentence which reflects changes in sentiment. Although not shown in FIG. 2, the style transfer engine 212 can also directly receive the text information provided by the speech recognizer engine 204.

A.7. End-to-End Solution

Figure 16:
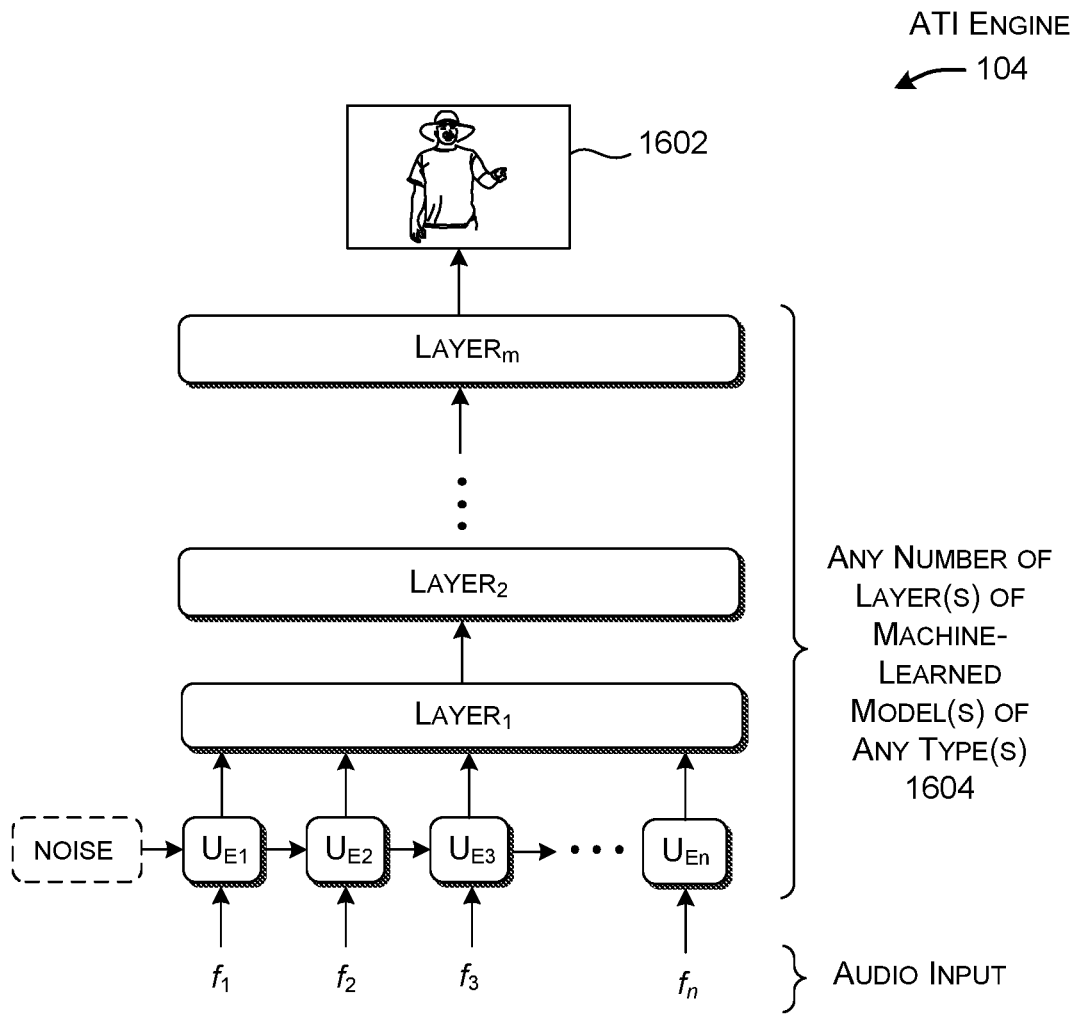
FIG. 16 shows another implementation of the ATI engine. This implementation uses an end-to-end machine-trained model.

FIG. 16 shows another implementation of the ATI engine 104. In this case, the ATI engine 104 uses a single machine-trained model to perform all of the functions of the above-described audio preprocessing engine 202, speech recognizer engine 204, sentiment classification engine 206, image creation engine 208, and style transfer engine 212. This model constitutes an end-to-end solution because it transforms audio content from an initial state to a final stylized image 1602. In one implementation, the ATI engine 104 achieves this result using an architecture that includes any number of machine-trained layers 1604. The layers 1604 can incorporate processing elements associated with one or more different types of models. For example, the ATI engine 104 can use one or more Recurrent Neural Network (RNN) layers to translate input audio features into a hidden state representation of the audio content's meaning(s) and sentiment(s). Each RNN layer can include a chain of LSTNI units, as previous described, or some type of RNN unit. The ATI engine 104 can then use a Convolutional Neural Network (CNN) to map the output of the RNN layers into the final stylized image 1602.

Although not shown, a training system trains such an end-to-end model using a data store of training examples. For example, each training example can associate audio content with an image that is considered a truthful depiction of the audio content's semantic and sentiment-related import. For instance, the training examples can be culled from one or more movie items. By consolidating all of the separate engines into a single model, the training system can produce a model that is more compact than a multi-engine model, and thus requires less space to store and less memory to run. Moreover, the training phase of the multi-engine model can forego at least some of the manual parameter-tuning involved in developing individual component engines.

B. ILLUSTRATIVE PROCESSES

Figure 17:
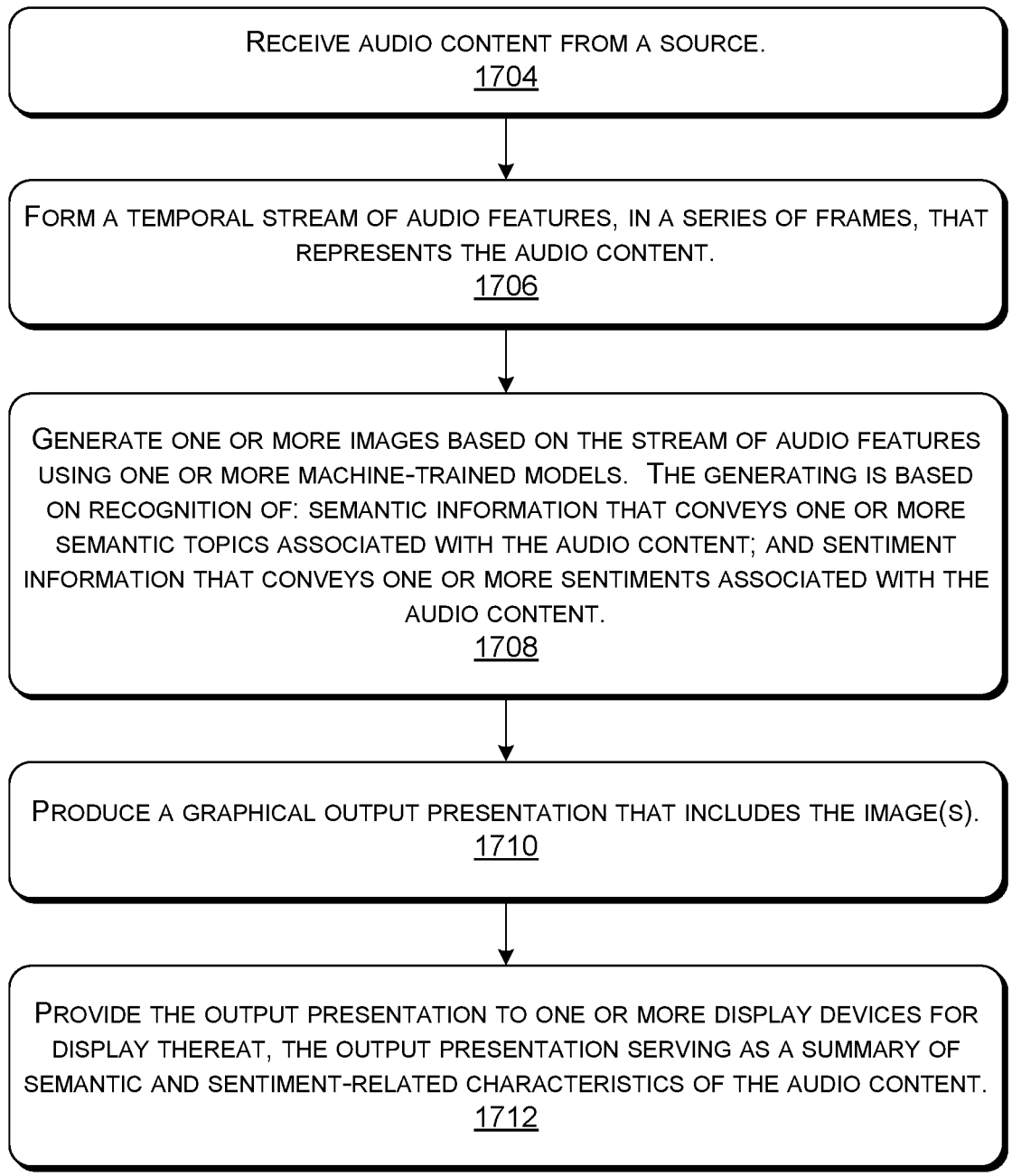
FIG. 17 shows an overview of the operation of the computing environment of FIG. 1.
Figure 18:
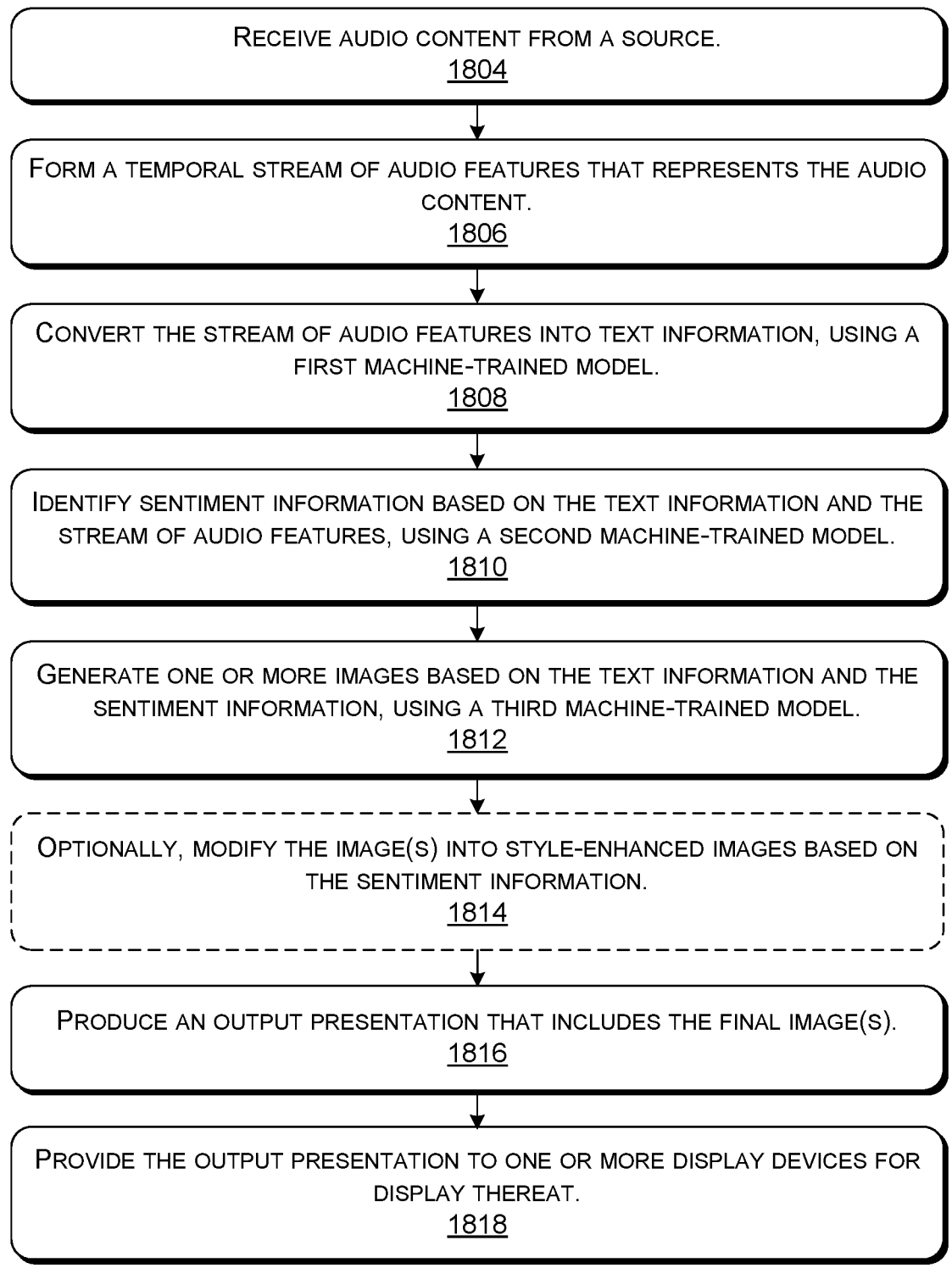
FIG. 18 shows a more specific overview of the operation of the computing environment of FIG. 1.

FIGS. 17 and 18 show processes (1702, 1802) that explain the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIG. 17 shows a process 1702, performed by one or more computing devices 106, for processing digital audio content. In block 1704, the computing device(s) 106 receives audio content from a source. In block 1706, the computing device(s) 106 forms a temporal stream of audio features, in a series of frames, that represents the audio content. In block 1708, the computing device(s) 106 generates one or more images based on the stream of audio features using one or more machine-trained models, the generating operation being based on recognition of: semantic information that conveys one or more semantic topics associated with the audio content; and sentiment information that conveys one or more sentiments associated with the audio content. In block 1710, the computing device(s) 106 produces a graphical output presentation that includes the image(s). In block 1712, the computing device(s) 106 provides the output presentation to one or more display devices for display thereat, the output presentation serving as a summary of semantic and sentiment-related characteristics of the audio content.

FIG. 18 shows another process 1802, performed by one or more computing devices 106 for processing digital audio content. In block 1804, the computing device(s) 106 receives audio content from a source. In block 1806, the computing device(s) 106 forms a temporal stream of audio features that represents the audio content. In block 1808, the computing device(s) 106 converts the stream of audio features into text information, using a first machine-trained model. In block 1810, the computing device(s) 106 identifies sentiment information based on the text information and the stream of audio features, using a second machine-trained model. In block 1812, the computing device(s) 106 generates one or more images based on the text information and the sentiment information using a third machine-trained model. In block 1814, the computing device(s) 106 optionally modifies the image(s) produced in block 1812 into style-enhanced images based on the sentiment information. In block 1816, the computing device(s) 106 produces an output presentation that includes the final image(s). In block 1818, the computing device(s) 106 provides the output presentation to one or more display devices for display thereat.

C. REPRESENTATIVE COMPUTING FUNCTIONALITY

Figure 19:
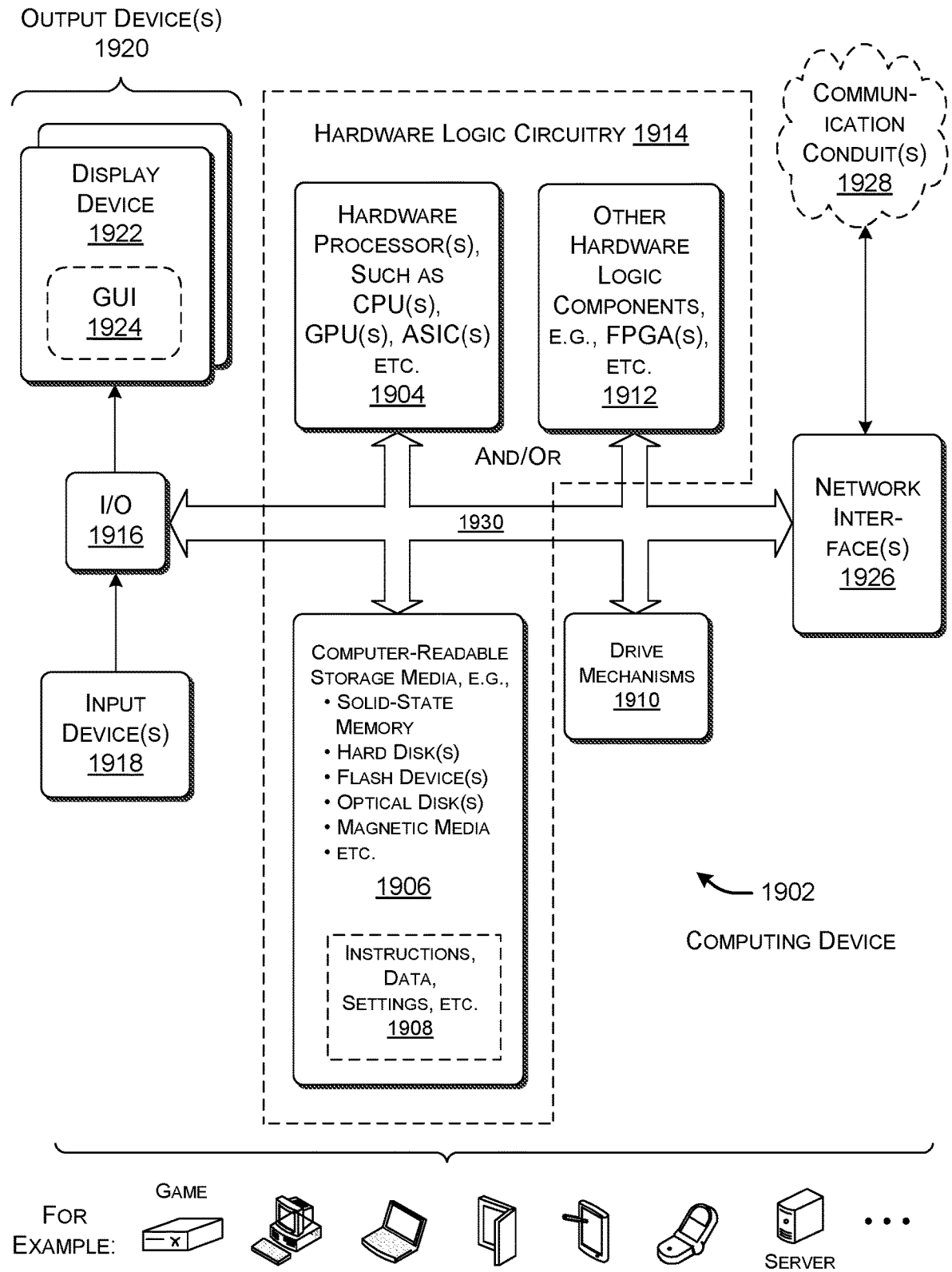
FIG. 19 shows an illustrative type of computing device that can be used to implement any aspect of the features shown in the foregoing drawings.

FIG. 19 shows a computing device 1902 that can be used to implement any aspect of the mechanisms set forth in the above-described figures. For instance, the type of computing device 1902 shown in FIG. 19 can be used to implement any computing device(s) 106 shown in FIG. 1. In all cases, the computing device 1902 represents a physical and tangible processing mechanism.

The computing device 1902 can include one or more hardware processors 1904. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1902 can also include computer-readable storage media 1906, corresponding to one or more computer-readable media hardware units. The computer-readable storage media 1906 retains any kind of information 1908, such as machine-readable instructions, settings, data, etc. Without limitation, for instance, the computer-readable storage media 1906 may include one or more solid-state devices, one or more magnetic hard disks, one or more optical disks, magnetic tape, and so on. Any instance of the computer-readable storage media 1906 can use any technology for storing and retrieving information. Further, any instance of the computer-readable storage media 1906 may represent a fixed or removable component of the computing device 1902. Further, any instance of the computer-readable storage media 1906 may provide volatile or non-volatile retention of information.

The computing device 1902 can utilize any instance of the computer-readable storage media 1906 in different ways. For example, any instance of the computer-readable storage media 1906 may represent a hardware memory unit (such as Random Access Memory (RAM)) for storing transient information during execution of a program by the computing device 1902, and/or a hardware storage unit (such as a hard disk) for retaining/archiving information on a more permanent basis. In the latter case, the computing device 1902 also includes one or more drive mechanisms 1910 (such as a hard drive mechanism) for storing and retrieving information from an instance of the computer-readable storage media 1906.

The computing device 1902 may perform any of the functions described above when the hardware processor(s) 1904 carry out computer-readable instructions stored in any instance of the computer-readable storage media 1906. For instance, the computing device 1902 may carry out computer-readable instructions to perform each block of the processes described in Section B.

Alternatively, or in addition, the computing device 1902 may rely on one or more other hardware logic components 1912 to perform operations using a task-specific collection of logic gates. For instance, the hardware logic component(s) 1912 may include a fixed configuration of hardware logic gates, e.g., that are created and set at the time of manufacture, and thereafter unalterable. Alternatively, or in addition, the other hardware logic component(s) 1912 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 19 generally indicates that hardware logic circuitry 1914 includes any combination of the hardware processor(s) 1904, the computer-readable storage media 1906, and/or the other hardware logic component(s) 1912. That is, the computing device 1902 can employ any combination of the hardware processor(s) 1904 that execute machine-readable instructions provided in the computer-readable storage media 1906, and/or one or more other hardware logic component(s) 1912 that perform operations using a fixed and/or programmable collection of hardware logic gates. More generally stated, the hardware logic circuitry 1914 corresponds to one or more hardware logic components of any type(s) that perform operations based on logic stored in and/or otherwise embodied in the hardware logic component(s).

In some cases (e.g., in the case in which the computing device 1902 represents a user computing device), the computing device 1902 also includes an input/output interface 1916 for receiving various inputs (via input devices 1918), and for providing various outputs (via output devices 1920). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1922 and an associated graphical user interface presentation (GUI) 1924. The display device 1922 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1902 can also include one or more network interfaces 1926 for exchanging data with other devices via one or more communication conduits 1928. One or more communication buses 1930 communicatively couple the above-described components together.

The communication conduit(s) 1928 can be implemented in any manner, e.g., by a local area computer network, a wide area computer network (e.g., the Internet), point-to-point connections, etc., or any combination thereof. The communication conduit(s) 1928 can include any combination of hardwired links, wireless links, routers, gateway functionality, name servers, etc., governed by any protocol or combination of protocols.

FIG. 19 shows the computing device 1902 as being composed of a discrete collection of separate units. In some cases, the collection of units may correspond to discrete hardware units provided in a computing device chassis having any form factor. FIG. 19 shows illustrative form factors in its bottom portion. In other cases, the computing device 1902 can include a hardware logic component that integrates the functions of two or more of the units shown in FIG. 1. For instance, the computing device 1902 can include a system on a chip (SoC or SOC), corresponding to an integrated circuit that combines the functions of two or more of the units shown in FIG. 19.

The following summary provides a non-exhaustive set of illustrative aspects of the technology set forth herein.

According to a first aspect, one or more computing devices are described for processing digital audio content. The computer device(s) includes hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates. The operations include: receiving audio content from a source; forming a temporal stream of audio features, in a series of frames, that represents the audio content; and generating one or more images based on the stream of audio features using one or more machine-trained models. The generating operation is based on recognition of: semantic information that conveys one or more semantic topics associated with the audio content; and sentiment information that conveys one or more sentiments associated with the audio content. The operations further include: producing a graphical output presentation that includes the image(s); and providing the output presentation to one or more display devices for display thereat. The output presentation serves as a summary of semantic and sentiment-related characteristics of the audio content.

According to a second aspect, the operations further include: converting the stream of audio features into text information; and identifying the sentiment information based on the text information and the stream of audio features. The generating operation further includes generating the image(s) based on the text information and the sentiment information.

According to a third aspect, dependent on the second aspect, the converting operation uses a recurrent neural network (RNN).

According to a fourth aspect, dependent on the second aspect, the generating operation uses a machine-trained generative model to synthesize the image(s).

According to a fifth aspect, dependent on the fourth aspect, the generative model is produced using a training system that employs a generative adversarial network (GAN).

According to a sixth aspect, dependent on the second aspect, the generating operation includes retrieving one or more preexisting images that match the text information and the sentiment information.

According to a seventh aspect, dependent on the second aspect, the image(s) correspond to one or more original images, and wherein the operations further include modifying the original image(s) into one or more style-enhanced images based on the sentiment information.

According to an eighth aspect, dependent on the seventh aspect, the modifying operation uses a neural network that is trained to duplicate first-level content associated with the original image(s), and second-level content associated with a style image. The first-level content is higher than the second-level content, and the style image is associated with the sentiment information.

According to a ninth aspect, dependent on the seventh aspect, the modifying operation includes: identifying an instance of style information from a set of possible instances of style information, based on the sentiment information; and applying the instance of style information that is identified to the original image(s).

According to tenth aspect, dependent on the seventh aspect, the generating operation is performed at a first rate, and the modifying operation is performed at a second rate, the second rate being greater than the first rate.

According to an eleventh aspect, the operations are implemented by an end-to-end machine-trained model that maps the stream of audio features into the image(s).

According to a twelfth aspect, the receiving operation includes receiving a message from a sender, over a computer network, which contains the audio content. The output presentation corresponds to a user notification that contains the image(s), the user notification notifying a recipient of the message sent by the sender. The forming and generating operations are performed by the recipient of the message or the sender of the message.

According to a thirteenth aspect, the receiving operation includes dynamically receiving the audio content in response to real-time speech of a first user captured by at least one microphone. The providing operation includes providing the output presentation to a second user to assist the second user in understanding the speech of the first user.

According to a fourteenth aspect, the audio content is associated with an audio file stored in a data store. The receiving operation includes accessing the audio file from the data store. The operations further include generating a visual identifier based on the audio content, and associating the visual identifier with the audio file. The output presentation includes the visual identifier.

According to a fifteenth aspect, the image(s) correspond to plural images that represent a temporal flow of the semantic information and sentiment information conveyed by the audio content. The output presentation includes a dynamic presentation of the plural images synchronized with a temporal presentation of the audio content.

According to a sixteenth aspect, a method is described, implemented by one or more computing devices, for processing digital audio content. The method includes: receiving audio content from a source; forming a temporal stream of audio features that represents the audio content; converting the stream of audio features into text information using a first machine-trained model; identifying sentiment information based on the text information and the stream of audio features using a second machine-trained model; generating one or more images based on the text information and the sentiment information using a third machine-trained model; producing a graphical output presentation that includes the image(s); and providing the output presentation to one or more display devices for display thereat.

According to a seventeenth aspect, dependent on the sixteenth aspect, the image(s) correspond to one or more original images. The method further includes modifying the original image(s) into one or more style-enhanced images based on the sentiment information.

According to an eighteenth aspect, dependent on the sixteenth aspect, the first, second, and third machine-trained models are different respective machine-trained models.

According to a nineteenth aspect, dependent on the sixteenth aspect, the first, second, and third machine-trained models correspond to parts of a single end-to-end machine-trained model.

According to a twentieth aspect, a computer-readable storage medium for storing computer-readable instructions is described. The computer-readable instructions, when executed by one or more hardware processors, perform a method that includes: receiving audio content from a source; forming a temporal stream of audio features that represents the audio content; converting the stream of audio features into text information; identifying sentiment information based on the text information and the stream of audio features; generating one or more images based on the text information and the sentiment information using a machine-trained generative model, wherein the generative model is produced using a training system that employs a generative adversarial network (GAN) system; producing a graphical output presentation that includes the image(s); and providing the output presentation to one or more display devices for display thereat.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for processing digital audio content, comprising:
   hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
   receiving audio content from a source;
   forming a temporal stream of audio features, in a series of frames, that represents the audio content that is received by said receiving;
   generating one or more images based on the stream of audio features using one or more machine-trained models,
   said generating being based on recognition of:
      semantic information that conveys one or more semantic topics associated with the audio content that is received by said receiving; and
      sentiment information that conveys one or more sentiments associated with the audio content that is received by said receiving;
   producing a graphical output presentation that includes said one or more images; and
   providing the output presentation to one or more display devices for display thereat,
   the output presentation serving as a summary of semantic and sentiment-related characteristics of the audio content that is received by said receiving,
   wherein the operations further include:
      converting the stream of audio features into text information; and
      identifying the sentiment information based on the text information and the stream of audio features,
   wherein said generating uses a machine-trained generative model to synthesize each of said one or more images from a combination of the text information and the sentiment information.

2. The one or more computing devices of claim 1, wherein said converting uses a recurrent neural network (RNN).

3. The one or more computing devices of claim 1, wherein the generative model is produced using a training system that employs a generative adversarial network (GAN).

4. The one or more computing devices of claim 1,
   wherein said receiving includes receiving, by a recipient computing device operated by a recipient, a message from a sender computing device operated by a sender, the message being transmitted over a computer network, and the message containing the audio content that is received by said receiving,
   wherein the output presentation corresponds to a user notification that contains said one or more images, the user notification notifying the recipient of the message sent by the sender, and
   wherein said forming and generating are performed by the recipient computing device or the sender computing device.

5. The one or more computing devices of claim 1,
   wherein the audio content that is received by said receiving is associated with an audio file stored in a data store,
   wherein said receiving comprises accessing the audio file from the data store,
   wherein the operations further include generating a visual identifier based on the audio content that is received by said receiving, and associating the visual identifier with the audio file, and
   wherein the output presentation includes the visual identifier.

6. One or more computing devices for processing digital audio content, comprising:
   hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
   receiving audio content from a source;
   forming a temporal stream of audio features, in a series of frames, that represents the audio content that is received by said receiving;
   generating one or more images based on the stream of audio features using one or more machine-trained models,
   said generating being based on recognition of:
      semantic information that conveys one or more semantic topics associated with the audio content that is received by said receiving; and
      sentiment information that conveys one or more sentiments associated with the audio content that is received by said receiving;
   producing a graphical output presentation that includes said one or more images; and
   providing the output presentation to one or more display devices for display thereat,
   the output presentation serving as a summary of semantic and sentiment-related characteristics of the audio content that is received by said receiving,
   wherein said generating comprises using a machine-trained generative model to synthesize each of said one or more images based on a combination of the semantic information and the sentiment information,
   wherein said generating includes generating one or more original images, and
   wherein the operations further include modifying said one or more original images into one or more style-enhanced images based on the sentiment information, said one or more images that are provided in said providing of the output presentation including said one or more style-enhanced images.

7. The one or more computing devices of claim 6,
   wherein said modifying uses a neural network that is trained to duplicate first-level content associated with said one or more original images, and second-level content associated with a style image,
   wherein the first-level content is higher than the second-level content, and
   wherein the style image is associated with the sentiment information.

8. The one or more computing devices of claim 6, wherein said modifying comprises:
   identifying an instance of style information from a set of possible instances of style information, based on the sentiment information; and applying the instance of style information that is identified to said one or more original images.

9. The one or more computing devices of claim 6, wherein said generating of said one or more original images is performed at a first rate, and said modifying is performed at a second rate, the second rate being greater than the first rate.

10. One or more computing devices for processing digital audio content, comprising:
hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
receiving audio content from a source;
forming a temporal stream of audio features, in a series of frames, that represents the audio content that is received by said receiving;
generating one or more images based on the stream of audio features,
said generating being based on recognition of:
semantic information that conveys one or more semantic topics associated with the audio content that is received by said receiving; and
sentiment information that conveys one or more sentiments associated with the audio content that is received by said receiving;
producing a graphical output presentation that includes said one or more images; and
providing the output presentation to one or more display devices for display thereat,
the output presentation serving as a summary of semantic and sentiment-related characteristics of the audio content that is received by said receiving,
wherein the operations are implemented by an end-to-end machine-trained model that maps the stream of audio features into said one or more images.

11. The one or more computing devices of claim 10, wherein the operations further include:
converting the stream of audio features into text information; and
identifying the sentiment information based on at least the text information,
wherein said generating comprises generating each of said one or more images based on the text information and the sentiment information.

12. The one or more computing devices of claim 10,
wherein said generating includes generating one or more original images, and
wherein the operations further include modifying said one or more original images into one or more style-enhanced images based on the sentiment information, said one or more images that are provided in said providing of the output presentation including said one or more style-enhanced images.

13. One or more computing devices for processing digital audio content, comprising:
hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
receiving audio content from a source;
forming a temporal stream of audio features, in a series of frames, that represents the audio content that is received by said receiving;
generating one or more images based on the stream of audio features using one or more machine-trained models,
said generating being based on recognition of:
semantic information that conveys one or more semantic topics associated with the audio content that is received by said receiving; and
sentiment information that conveys one or more sentiments associated with the audio content that is received by said receiving;
producing a graphical output presentation that includes said one or more images; and
providing the output presentation to one or more display devices for display thereat,
wherein said generating comprises using a machine-trained generative model to synthesize each of said one or more images based on a combination of the semantic information and the sentiment information,
wherein said receiving comprises dynamically receiving the audio content that is received by said receiving in response to real-time speech of a first user captured by at least one microphone, and
wherein said providing comprises providing the output presentation to a second user to assist the second user in understanding the speech of the first user.

14. The one or more computing devices of claim 13, wherein the operations further include:
converting the stream of audio features into text information; and
identifying the sentiment information based on at least the text information,
wherein said generating comprises generating each of said one or more images based on the text information and the sentiment information.

15. One or more computing devices for processing digital audio content, comprising:
hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
receiving audio content from a source;
forming a temporal stream of audio features, in a series of frames, that represents the audio content that is received by said receiving;
generating one or more images based on the stream of audio features using one or more machine-trained models,
said generating being based on recognition of:
semantic information that conveys one or more semantic topics associated with the audio content that is received by said receiving; and
sentiment information that conveys one or more sentiments associated with the audio content that is received by said receiving;
producing a graphical output presentation that includes said one or more images; and
providing the output presentation to one or more display devices for display thereat,
wherein said generating comprises using a machine-trained generative model to synthesize each of said one or more images based on a combination of the semantic information and the sentiment information,
wherein said one or more images correspond to plural images that represent a temporal flow of the semantic information and the sentiment information, and
wherein the output presentation includes a dynamic presentation of the plural images synchronized with a temporal presentation of the audio content that is received by said receiving.

16. The one or more computing devices of claim 15, wherein the operations further include:
converting the stream of audio features into text information; and
identifying the sentiment information based on at least the text information,
wherein said generating comprises generating each of the plural images based on the text information and the sentiment information.

17. A method, implemented by one or more computing devices, for processing digital audio content, comprising:
receiving audio content from a source;
forming a temporal stream of audio features that represents the audio content that is received by said receiving;
converting the stream of audio features into text information using a first machine-trained model;
identifying sentiment information based on the text information and the stream of audio features using a second machine-trained model;
generating one or more images based on the text information and the sentiment information using a third machine-trained model, said third machine-trained model being a generative model that is configured to synthesize each of said one or more images from a combination of the text information and the sentiment information;
producing a graphical output presentation that includes said one or more images; and
providing the output presentation to one or more display devices for display thereat.

18. The method of claim 17,
wherein said generating includes generating one or more original images, and
wherein the method further comprises modifying said one or more original images into one or more style-enhanced images based on the sentiment information, said one or more images that are provided in said providing of the output presentation including said one or more style-enhanced images.

19. The method of claim 17, wherein the first, second, and third machine-trained models correspond to parts of a single end-to-end machine-trained model.

20. A computer-readable storage medium for storing computer-readable instructions, the computer-readable instructions, when executed by one or more hardware processors, performing a method that comprises:
receiving audio content from a source;
forming a temporal stream of audio features that represents the audio content that is received by said receiving;
converting the stream of audio features into text information;
identifying sentiment information based on the text information and the stream of audio features;
generating one or more images based on the text information and the sentiment information using a machine-trained generative model, wherein the generative model is produced using a training system that employs a generative adversarial network (GAN) system, the generative model being configured to synthesize each of said one or more images from a combination of the text information and the sentiment information;
producing a graphical output presentation that includes said one or more images; and
providing the output presentation to one or more display devices for display thereat.

\* \* \* \* \*